United States Patent
Suzuki

(10) Patent No.: US 12,498,044 B2
(45) Date of Patent: Dec. 16, 2025

(54) SLIDING COMPONENT

(71) Applicant: Eagle Industry Co., Ltd., Tokyo (JP)

(72) Inventor: Hiroshi Suzuki, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 364 days.

(21) Appl. No.: 17/425,678

(22) PCT Filed: Jan. 31, 2020

(86) PCT No.: PCT/JP2020/003647
§ 371 (c)(1),
(2) Date: Jul. 23, 2021

(87) PCT Pub. No.: WO2020/162351
PCT Pub. Date: Aug. 13, 2020

(65) Prior Publication Data
US 2022/0099189 A1    Mar. 31, 2022

(30) Foreign Application Priority Data

Feb. 4, 2019  (JP) .................................. 2019-017875

(51) Int. Cl.
*F16J 15/34*   (2006.01)

(52) U.S. Cl.
CPC ....... *F16J 15/3412* (2013.01); *F16C 2361/43* (2013.01)

(58) Field of Classification Search
CPC ......................... F16J 15/3412; F16C 2361/43
See application file for complete search history.

(56) References Cited

U.S. PATENT DOCUMENTS 3,383,116 A   5/1968  Carter ............................ 277/96
3,527,465 A   9/1970  Guinard
(Continued)

FOREIGN PATENT DOCUMENTS

CN   1245552   2/2000   ............... F16J 15/34
CN   2460801   11/2001  ............... F16J 15/40
(Continued)

OTHER PUBLICATIONS

A Second Office Action issued on Jul. 25, 2016 by the State Intellectual Property Office of China counterpart application No. 201380029125.0.
(Continued)

*Primary Examiner* — Eugene G Byrd
(74) *Attorney, Agent, or Firm* — HAYES SOLOWAY P.C.

(57) ABSTRACT

There is provided a sliding component that supplies a sealed fluid to a leakage side in a gap between sliding surfaces to exhibit high lubricity and has a small leakage of the sealed fluid. A sliding component that has an annular shape and is disposed in a place where relative rotation is performed in a rotary machine, includes a plurality of dynamic pressure generating mechanisms provided in a sliding surface of the sliding component, each of the dynamic pressure generating mechanisms including a deep groove portion that communicates with a leakage side, and a plurality of shallow groove portions that communicate with the deep groove portion and are arranged in a circumferential direction in parallel relationship to each other.

6 Claims, 10 Drawing Sheets

(56) References Cited

U.S. PATENT DOCUMENTS

| | | | | |
|---|---|---|---|---|
| 3,675,935 | A | 7/1972 | Ludwig | F16J 15/342 |
| 3,695,789 | A * | 10/1972 | Jansson | F01C 21/003 418/133 |
| 3,704,019 | A | 11/1972 | McHugh | 277/400 |
| 3,782,737 | A | 1/1974 | Ludwig et al. | 277/27 |
| 3,870,382 | A * | 3/1975 | Reinhoudt | F16C 17/045 384/123 |
| 4,007,974 | A * | 2/1977 | Huber | F16C 17/045 384/123 |
| 4,056,478 | A | 11/1977 | Capelli | C01M 5/00 |
| 4,071,253 | A | 1/1978 | Heinen et al. | 277/3 |
| 4,120,544 | A * | 10/1978 | Huber | F16C 33/107 384/292 |
| 4,523,764 | A | 6/1985 | Albers et al. | 277/3 |
| 4,889,348 | A | 12/1989 | Amundson | 277/306 |
| 5,066,026 | A * | 11/1991 | Heck | F16J 15/3412 277/400 |
| 5,071,141 | A | 12/1991 | Lai et al. | |
| 5,092,612 | A | 3/1992 | Victor et al. | 277/96.1 |
| 5,174,584 | A | 12/1992 | Lahrman | 277/400 |
| 5,180,173 | A | 1/1993 | Kimura et al. | |
| 5,222,743 | A | 6/1993 | Goldswain | F16J 15/3412 |
| 5,224,714 | A | 7/1993 | Kimura | 277/400 |
| 5,368,314 | A | 11/1994 | Victor | F16J 15/3412 |
| 5,447,316 | A | 9/1995 | Matsui | 277/400 |
| 5,556,111 | A | 9/1996 | Sedy | 277/400 |
| 5,558,341 | A | 9/1996 | McNickle | 277/400 |
| 5,769,604 | A | 6/1998 | Gardner et al. | 415/170.1 |
| 5,834,094 | A | 11/1998 | Etsion et al. | 428/156 |
| 5,947,481 | A | 9/1999 | Young | 277/400 |
| 5,952,080 | A | 9/1999 | Etsion et al. | 428/156 |
| 6,002,100 | A | 12/1999 | Etsion | 219/121.71 |
| 6,046,430 | A | 4/2000 | Etsion | 219/121.71 |
| 6,135,458 | A | 10/2000 | Fuse | 277/401 |
| 6,152,452 | A | 11/2000 | Wang | 277/400 |
| 6,213,473 | B1 | 4/2001 | Lebeck | |
| 6,446,976 | B1 | 9/2002 | Key et al. | F16J 15/34 |
| 6,692,006 | B2 | 2/2004 | Holder | 277/346 |
| 6,726,213 | B2 | 4/2004 | Wang | 277/400 |
| 7,258,346 | B2 | 8/2007 | Tejima | 277/399 |
| 7,377,518 | B2 | 5/2008 | Lai | 277/400 |
| 7,744,094 | B2 * | 6/2010 | Yanagisawa | F16J 15/342 277/408 |
| 7,758,051 | B2 | 7/2010 | Roberts-Haritonov | 277/401 |
| 7,931,277 | B2 | 4/2011 | Garrison | 277/399 |
| 8,100,405 | B2 | 1/2012 | Kneeland et al. | 277/355 |
| 8,342,534 | B2 | 1/2013 | Vasagar | 277/399 |
| 8,585,060 | B2 | 11/2013 | Oshii et al. | 277/401 |
| 8,757,632 | B2 | 6/2014 | Dobosz | F16J 15/3412 |
| 9,151,390 | B2 | 10/2015 | Hosoe | F16J 15/3412 |
| 9,169,931 | B2 | 10/2015 | Tokunaga | F16J 15/34 |
| 9,228,660 | B2 | 1/2016 | Hosoe | F16J 15/3412 |
| 9,347,566 | B2 * | 5/2016 | Tokunaga | F16J 15/3412 |
| 9,353,865 | B2 * | 5/2016 | Lattin | F16N 21/00 |
| 9,353,867 | B2 | 5/2016 | Itadani et al. | F16J 15/3448 |
| 9,494,239 | B2 | 11/2016 | Hosoe | F16J 15/342 |
| 9,512,923 | B2 | 12/2016 | Inoue et al. | F16J 15/34 |
| 9,574,667 | B2 | 2/2017 | Takahashi et al. | F16J 15/342 |
| 9,772,037 | B2 | 9/2017 | Itadani et al. | F16J 15/3412 |
| 9,784,372 | B2 | 10/2017 | Iguchi | F16J 15/342 |
| 9,863,473 | B2 | 1/2018 | Hosoe et al. | F16C 33/72 |
| 9,958,010 | B2 | 5/2018 | Itadani | F16C 33/74 |
| 9,982,715 | B2 | 5/2018 | Gorges et al. | F16C 33/201 |
| 10,054,230 | B2 | 8/2018 | Katori et al. | F16J 15/3412 |
| 10,132,411 | B2 | 11/2018 | Hosoe et al. | F16J 15/164 |
| 10,337,620 | B2 | 7/2019 | Tokunaga et al. | F16J 15/342 |
| 10,443,737 | B2 | 10/2019 | Itadani | F16J 15/342 |
| 10,495,228 | B2 | 12/2019 | Itadani | F16J 15/342 |
| 10,612,666 | B2 | 4/2020 | Tokunaga | F16J 15/36 |
| 10,823,162 | B2 | 11/2020 | Kume | F04B 27/1804 |
| 10,865,883 | B2 | 12/2020 | Seki et al. | F16J 15/3404 |
| 11,248,706 | B2 | 2/2022 | Imura | F16C 33/74 |
| 11,320,052 | B2 | 5/2022 | Imura et al. | F16J 15/34 |
| 11,708,911 | B2 | 7/2023 | Imura | F16J 15/34 |
| 2002/0014743 | A1 | 2/2002 | Zheng | 277/358 |
| 2002/0093141 | A1 | 7/2002 | Wang | F16J 15/34 |
| 2002/0109302 | A1 * | 8/2002 | Muraki | F16J 15/3412 277/408 |
| 2002/0158416 | A1 | 10/2002 | Hosanna | F16J 15/3404 |
| 2004/0080112 | A1 | 4/2004 | Tejima | F16J 15/3436 |
| 2005/0212217 | A1 | 9/2005 | Tejima | 277/399 |
| 2005/0263963 | A1 | 12/2005 | Lai | 277/399 |
| 2007/0228664 | A1 | 10/2007 | Anand | F16J 15/3496 |
| 2007/0267820 | A1 | 11/2007 | Martin | F16J 15/3496 |
| 2007/0275267 | A1 | 11/2007 | Sabouni | F16J 15/3496 |
| 2007/0296156 | A1 | 12/2007 | Yanagisawa et al. | 277/352 |
| 2008/0100001 | A1 | 5/2008 | Flaherty | |
| 2009/0200749 | A1 | 8/2009 | Teshima | F16J 15/3484 |
| 2011/0215531 | A1 | 9/2011 | Tokunaga et al. | 277/399 |
| 2011/0215535 | A1 | 9/2011 | Vasagar | 277/559 |
| 2011/0305871 | A1 | 12/2011 | Tabuchi | F16J 15/3284 |
| 2012/0018957 | A1 | 1/2012 | Watanabe | F16J 15/34 |
| 2012/0217705 | A1 | 8/2012 | Hosoe | 277/400 |
| 2013/0168928 | A1 | 7/2013 | Schrufer | C10M 103/02 |
| 2013/0209011 | A1 | 8/2013 | Tokunaga | |
| 2014/0159314 | A1 | 6/2014 | Hosoe | F16J 15/34 |
| 2014/0197600 | A1 | 7/2014 | Hosoe | F16J 15/342 |
| 2014/0203517 | A1 | 7/2014 | Ferris | F16J 15/3412 |
| 2014/0217676 | A1 | 8/2014 | Hosoe et al. | 277/350 |
| 2014/0319776 | A1 | 10/2014 | Theike et al. | |
| 2015/0115537 | A1 | 4/2015 | Tokunaga | F16J 15/3412 |
| 2015/0115540 | A1 | 4/2015 | Tokunaga | F16J 15/34 |
| 2015/0123350 | A1 | 5/2015 | Itadani | F16J 15/3412 |
| 2015/0167847 | A1 | 6/2015 | Tokunaga | |
| 2015/0345642 | A1 | 12/2015 | Haas | F16J 15/3496 |
| 2015/0377297 | A1 | 12/2015 | Tokunaga et al. | F16C 33/748 |
| 2016/0033045 | A1 | 2/2016 | Itadani et al. | F16J 15/3412 |
| 2016/0097457 | A1 | 4/2016 | Sun et al. | F16J 15/3412 |
| 2017/0175726 | A1 | 6/2017 | Kume | F04B 27/1804 |
| 2017/0241549 | A1 | 8/2017 | Itadani | F16J 15/3412 |
| 2017/0261107 | A1 | 9/2017 | Martin | F16J 15/3452 |
| 2017/0350407 | A1 | 12/2017 | Yamamoto et al. | F04D 29/046 |
| 2018/0017163 | A1 | 1/2018 | Hosoe et al. | F16J 15/164 |
| 2018/0051809 | A1 * | 2/2018 | Yoshida | F16J 15/3412 |
| 2018/0073394 | A1 | 3/2018 | Tokunaga et al. | F01D 25/18 |
| 2018/0112711 | A1 | 4/2018 | Itadani | F16J 15/363 |
| 2018/0128377 | A1 | 5/2018 | Tukunaga et al. | F16J 15/342 |
| 2018/0128378 | A1 | 5/2018 | Tokunaga et al. | F16J 15/342 |
| 2018/0135699 | A1 | 5/2018 | Tokunaga et al. | F16C 33/80 |
| 2018/0172162 | A1 | 6/2018 | Tokunaga et al. | F16J 15/34 |
| 2018/0195618 | A1 | 7/2018 | Itadani et al. | F16J 15/3416 |
| 2018/0299015 | A1 | 10/2018 | Itadani | F16J 15/3448 |
| 2019/0170257 | A1 | 6/2019 | Hosoe et al. | F16J 15/3412 |
| 2019/0285115 | A1 | 9/2019 | Negishi et al. | F16C 17/045 |
| 2019/0301522 | A1 | 10/2019 | Negishi et al. | F16C 17/02 |
| 2019/0331162 | A1 | 10/2019 | Negishi | F16J 15/34 |
| 2020/0224768 | A1 | 7/2020 | Imura | F16J 15/3412 |
| 2020/0240470 | A1 | 7/2020 | Sorgenti | F16J 15/3212 |
| 2020/0332901 | A1 | 10/2020 | Imura | F16J 15/3412 |
| 2021/0041026 | A1 | 2/2021 | Imura | F16J 15/3424 |
| 2021/0048062 | A1 | 2/2021 | Masumi et al. | F16C 17/102 |
| 2021/0048106 | A1 | 2/2021 | Imura et al. | F16J 15/3412 |
| 2021/0080009 | A1 | 3/2021 | Kimura et al. | F16J 15/3412 |
| 2021/0116030 | A1 | 4/2021 | Kimura et al. | F16J 15/182 |
| 2021/0364034 | A1 | 11/2021 | Okada | F16J 15/342 |

FOREIGN PATENT DOCUMENTS

| | | | |
|---|---|---|---|
| CN | 1401924 | 3/2003 | F16J 15/16 |
| CN | 101644333 | 2/2010 | F16J 15/34 |
| CN | 201496542 | 6/2010 | F16J 15/16 |
| CN | 101793169 | 8/2010 | F01D 11/08 |
| CN | 101793324 | 8/2010 | F16J 15/16 |
| CN | 101861485 | 10/2010 | F16J 15/34 |
| CN | 203098871 | 7/2013 | F16J 15/34 |
| CN | 103557229 | 2/2014 | F16C 17/04 |
| CN | 103557334 | 2/2014 | F16J 15/34 |
| CN | 203641506 | 6/2014 | F16J 15/16 |
| CN | 104169622 | 11/2014 | F16J 15/34 |
| CN | 104321568 | 1/2015 | F16C 33/72 |
| CN | 104685273 | 6/2015 | F16J 15/34 |
| CN | 105014489 | 11/2015 | B24B 19/02 |
| CN | 106029294 | 10/2016 | B23K 26/364 |

(56) References Cited

FOREIGN PATENT DOCUMENTS

| | | | |
|---|---|---|---|
| CN | 205877184 | 1/2017 | ............... F16J 15/16 |
| CN | 205877198 | 1/2017 | ............... F16J 15/34 |
| CN | 106439023 | 2/2017 | ............... F16J 15/16 |
| CN | 106763778 | 5/2017 | ............... F16J 15/16 |
| CN | 107489770 | 12/2017 | ............... F16J 15/34 |
| CN | 107906206 | 4/2018 | ............... F16J 15/34 |
| CN | 109237042 | 1/2019 | ............... F16J 15/34 |
| CN | 110770456 | 2/2020 | ............... F16C 33/12 |
| CN | 111656065 | 9/2020 | ............... F16J 15/34 |
| DE | 3223703 | 6/1982 | ............... F16J 15/34 |
| DE | 102008038396 | 2/2010 | |
| EP | 0369295 | 11/1988 | ............... F16J 15/34 |
| EP | 0518681 | 12/1992 | ............... G11B 15/60 |
| EP | 0637706 | 8/1993 | ............... F16J 15/34 |
| EP | 2138225 | 12/2009 | ............... B01J 13/20 |
| EP | 2754931 | 7/2014 | ............... F16J 15/34 |
| EP | 3112078 | 1/2017 | ............ B23K 26/364 |
| EP | 3196516 | 7/2017 | ............... F16J 15/34 |
| EP | 3217049 | 9/2017 | ............... F16J 15/34 |
| EP | 3396186 | 10/2018 | ............... F16C 33/10 |
| EP | 33396185 | 10/2018 | ............... F16C 27/04 |
| EP | 3575621 | 12/2019 | ............... F16C 33/10 |
| EP | 3575643 | 12/2019 | ............... F16J 15/34 |
| EP | 3650722 | 5/2020 | ............... F16C 33/12 |
| FR | 2342440 | 9/1997 | ............... F16J 15/34 |
| GB | 1509482 | 5/1978 | ............... F16C 33/10 |
| GB | 2263952 | 8/1993 | ............... F16J 15/34 |
| JP | S51-034974 | 3/1976 | |
| JP | S52-143571 | 10/1977 | ............... F16J 15/26 |
| JP | 57163770 | 10/1982 | ............ F16J 15/3412 |
| JP | S59-195253 | 12/1984 | ............... F16J 15/34 |
| JP | S59-195254 | 12/1984 | ............... F16J 15/34 |
| JP | S63-190975 | 8/1988 | ............... F16J 15/34 |
| JP | H02-236067 | 9/1990 | ............... F16J 15/34 |
| JP | H02-136863 | 11/1990 | ............... F16J 15/34 |
| JP | H04-50559 | 2/1992 | ............... F16J 15/34 |
| JP | H04-337165 | 11/1992 | ............... F16J 15/34 |
| JP | H05-60247 | 3/1993 | ............... F16J 15/34 |
| JP | H05-296248 | 11/1993 | |
| JP | H05-90049 | 12/1993 | ............... F16J 15/34 |
| JP | H06-17941 | 1/1994 | ............... F16J 15/34 |
| JP | H06-117547 | 4/1994 | ............... F16J 15/34 |
| JP | H06-174107 | 6/1994 | ............... F16J 15/34 |
| JP | H06-323442 | 11/1994 | ............... F16J 15/34 |
| JP | H06-105105 | 12/1994 | ............... F16J 15/34 |
| JP | 9-89119 | 3/1997 | ............... F16J 15/34 |
| JP | 9-292034 | 11/1997 | ............... F16J 15/34 |
| JP | H10-281299 | 10/1998 | ............... F16J 15/34 |
| JP | H10-292867 | 11/1998 | |
| JP | H11-287329 | 10/1999 | ............... F16J 15/34 |
| JP | 3066367 | 5/2000 | ............... F16J 15/34 |
| JP | 2001-12458 | 1/2001 | ............... F16C 17/10 |
| JP | 2003-343730 | 12/2003 | ............... F16J 15/22 |
| JP | 2005-180652 | 7/2005 | ............... F16J 15/34 |
| JP | 2005-315391 | 11/2005 | |
| JP | 2005-337503 | 12/2005 | ............... F16J 15/34 |
| JP | 2006-77899 | 3/2006 | ............... F16J 15/34 |
| JP | 2006-90524 | 4/2006 | ............... F16C 17/02 |
| JP | 2006-183702 | 7/2006 | ............... F16C 17/04 |
| JP | 2007-162045 | 6/2007 | |
| JP | 2008-106940 | 5/2008 | ............... F16J 15/34 |
| JP | 2011-74931 | 4/2011 | ............... F16J 15/34 |
| JP | 2011-185292 | 9/2011 | ............... F16J 15/34 |
| JP | 2012-2295 | 1/2012 | ............... F16J 15/34 |
| JP | 2012-062534 | 3/2012 | |
| JP | 2012-122135 | 6/2012 | ............... C25D 15/02 |
| JP | 2013-213545 | 10/2013 | ............... F16C 32/06 |
| JP | 2014-529052 | 10/2014 | |
| JP | 2015-063647 | 4/2015 | |
| JP | 2015-68330 | 4/2015 | ............... F04C 29/00 |
| JP | 5693599 | 4/2015 | |
| JP | 2016-80090 | 5/2016 | ............... F16J 15/34 |
| JP | 5960145 | 7/2016 | ............... F16J 15/34 |
| KR | 10-2017-0093349 | 8/2017 | ............... F04B 53/10 |
| WO | WO 2006/051702 | 5/2006 | ............... F16J 15/34 |
| WO | WO 2011/115073 | 9/2011 | ............... F16J 15/34 |
| WO | WO 2012/046749 | 4/2012 | ............... F16J 15/34 |
| WO | WO 2013/035503 | 3/2013 | ............... F16J 15/34 |
| WO | WO2013053411 | 4/2013 | |
| WO | WO2014061544 | 4/2014 | |
| WO | WO2014148316 | 9/2014 | ............... F16J 15/34 |
| WO | WO2014148317 | 9/2014 | ............... F16J 15/34 |
| WO | WO 2014/174725 | 10/2014 | ............... F16J 15/34 |
| WO | WO2015111707 | 7/2015 | ............... F16J 15/18 |
| WO | WO2016035860 | 3/2016 | ............... F16J 15/34 |
| WO | WO 2016/167262 | 10/2016 | ............... F16J 15/34 |
| WO | WO 2016/186015 | 11/2016 | ............... F16J 15/34 |
| WO | WO 2016/186019 | 11/2016 | ............... F16J 15/34 |
| WO | WO 2016/186020 | 11/2016 | ............... F16J 15/34 |
| WO | WO 2016/203878 | 12/2016 | ............... F16J 15/34 |
| WO | WO 2017/002774 | 1/2017 | ............... F16J 15/34 |
| WO | WO 2017/061406 | 4/2017 | ............... F16J 15/34 |
| WO | WO 2018/092742 | 5/2018 | ............... F16J 15/34 |
| WO | WO 2018/105505 | 6/2018 | ............... F16J 33/12 |
| WO | WO2018/139231 | 8/2018 | ............... F16J 15/34 |

OTHER PUBLICATIONS

First Notification of Reason for Refusal with Search Report dated Sep. 25, 2015 by the State Intellectual Property Office of China for Chinese counterpart application No. 201380029125.0.
First Notification of Reason for Refusal with Search Report issued by the State Intellectual Property Office of China dated Aug. 24, 2015 for Chinese counterpart application No. 201380024836.9.
First Notification of Reason for Refusal with Search Report issued by the State Intellectual Property Office of China dated Aug. 26, 2015 for Chinese counterpart application No. 201380009242.0.
Second Notification of Reason for Refusal with issued by the State Intellectual Property Office of China dated Feb. 5, 2016 for Chinese counterpart application No. 201380024836.9.
First Office Action issued in Chinese Patent Appln. Serial No. 201980007372.8, dated Sep. 27, 2021, with English translation, 13 pages.
First Office Action issued in Chinese Patent Appln. Serial No. 201980010219.0, dated Nov. 30, 2021, with English translation, 13 pages.
International Preliminary Report on Patentability and Written Opinion issued in PCT/JP2013/070713, dated Feb. 10, 2015.
International Search Report (ISR) mailed Oct. 29, 2013, issued for International application No. PCT/JP2013/070713.
International Search Report and Written Opinion issued in PCT/JP2013/070714, dated Oct. 29, 2013, with English translation, 14 pages.
International Preliminary Report on Patentability issued in PCT/JP2013/070714, dated Feb. 10, 2015.
International Search Report and Written Opinion issued in PCT/JP2019/003381, with English translation, dated Apr. 2, 2019, 20 pages.
International Preliminary Report on Patentability issued in PCT/JP2019/003381, with English translation, dated Aug. 4, 2020, 12 pages.
International Search Report and Written Opinion issued in PCT/JP2019/000617, dated Apr. 10, 2019, with English translation, 21 pages.
International Preliminary Report on Patentability issued in PCT/JP2019/000617, dated Jul. 14, 2020, with English translation, 13 pages.
International Search Report and Written Opinion issued in PCT/JP2020/003645, dated Mar. 24, 2020, with English translation, 21 pages.
International Preliminary Report on Patentability issued in PCT/JP2020/003645, dated Aug. 10, 2021, with English translation, 11pages.
International Search Report and Written Opinion issued in PCT/JP2020/003641, dated Mar. 31, 2020, with English translation, 13 pages.
International Preliminary Report on Patentability issued in PCT/JP2020/003641, dated Aug. 10, 2021, with English translation, 7 pages.

(56) References Cited

OTHER PUBLICATIONS

International Search Report and Written Opinion issued in PCT/JP2020/003643, dated Mar. 17, 2020, with English translation, 17 pages.
International Preliminary Report on Patentability issued in PCT/JP2020/003643, dated Aug. 10, 2021, with English translation, 10 pages.
International Search Report and Written Opinion issued in PCT/JP2020/003648, dated Mar. 10, 2020, with English translation, 13 pages.
International Preliminary Report on Patentability issued in PCT/JP2020/003648, dated Aug. 10, 2021, with English translation, 7 pages.
International Search Report and Written Opinion issued in PCT/JP2020/003647, dated Mar. 24, 2020, with English translation, 14 pages.
International Preliminary Report on Patentability issued in PCT/JP2020/003647, dated Aug. 10, 2021, with English translation, 8 pages.
International Search Report and Written Opinion issued in PCT/JP2020/011926, dated Apr. 28, 2020, with English translation, 12 pages.
International Preliminary Report on Patentability issued in PCT/JP2020/011926, dated Sep. 28, 2021, 4 pages.
Korean Official Action issued in related Korean Patent Application Serial No. 10-2020-7019822, dated Oct. 26, 2021 with English translation (4 pages).
European Search Report issued in related European Patent Application Serial No. 19738181.7, dated Sep. 13, 2021 (10 pages).
European Search Report issued in related European Patent Application Serial No. 19748058.5, dated Oct. 8, 2021 (9 pages).
Office Action issued in U.S. Appl. No. 16/964,943, dated Oct. 4, 2021, 19 pages.
Chinese Official Action issued in related Chinese Patent Application Serial No. 202080010586.3, dated Jan. 12, 2023 with translation, 11 pages.
Chinese Official Action issued in related Chinese Patent Application Serial No. 202080010628.3, dated Feb. 21, 2023 with translation, 14 pages
Korean Official Action issued in related Korean Patent Application Serial No. 10-2021-7025489, dated Dec. 14, 2022 with translation, 23 pages.
Korean Official Action issued in related Korean Patent Application Serial No. 10-2021-7025490, dated Dec. 14, 2022 with translation, 10 pages.
Korean Official Action issued in related Korean Patent Application Serial No. 10-2021-7025491, dated Dec. 15, 2022 with translation, 12 pages.
Official Action issued in related U.S. Appl. No. 17/424,847, dated Feb. 2, 2023, 6 pages.
International Search Report and Written Opinion and International Preliminary Report on Patentability issued in PCT/JP2017/040830, dated Jan. 30, 2018, with English translations, 15 pages.
European Search Report issued in related European Patent Application Serial No. 20777157.7, dated Oct. 28, 2022 (7 pages).
European Search Report issued in related European Patent Application Serial No. 20752626.0, dated Oct. 4, 2022 (7 pages).
European Search Report issued in related European Patent Application Serial No. 20753172.4, dated Oct. 4, 2022 (7 pages).
Notice of Allowance issued in U.S. Appl. No. 16/959,105, dated Nov. 3, 2022, 9 pages.
Notice of Allowance issued in U.S. Appl. No. 17/690,911, dated Nov. 25, 2022, 11 pages.
Chinese Official Action issued in related Chinese Patent Application Serial No. 201980007372.8, dated Nov. 15, 2022 with translation, 7 pages.
Chinese Official Action issued in related Chinese Patent Application Serial No. 202080010661.6, dated Nov. 30, 2022 with translation, 15 pages.
Second Office Action issued in Chinese Patent Appln. Serial No. 201980007372.8, dated May 26, 2022, with English translation, 13 pages.
First Office Action issued in Chinese Patent Appln. Serial No. 202080010586.3, dated Aug. 8, 2022, with English translation, 15 pages.
First Office Action issued in Chinese Patent Appln. Serial No. 202080010580.6, dated Aug. 2, 2022, with English translation, 12 pages.
First Office Action issued in Chinese Patent Appln. Serial No. 202080010628.3, dated Aug. 2, 2022, with English translation, 15 pages.
First Office Action issued in Chinese Patent Appln. Serial No. 202080010661.6, dated Jul. 19, 2022, with English translation, 15 pages.
First Office Action issued in Chinese Patent Appln. Serial No. 202080011045.2, dated Jul. 18, 2022, with English translation, 10 pages.
First Office Action issued in Chinese Patent Appln. Serial No. 202080018532.1, dated Aug. 24, 2022, with English translation, 14 pages.
European Search Report issued in related European Patent Application Serial No. 20752802.7, dated Oct. 11, 2022 (7 pages).
European Search Report issued in related European Patent Application Serial No. 20752708, dated Oct. 4, 2022 (7 pages).
European Search Report issued in related European Patent Application Serial No. 20752625, dated Oct. 4, 2022 (10 pages).
European Search Report issued in related European Patent Application Serial No. 200752802, dated Oct. 11, 2022 (7 pages).
European Search Report issued in related European Patent Application Serial No. 20752709, dated Oct. 11, 2022 (9 pages).
Office Action issued in U.S. Appl. No. 16/959,105, dated Mar. 25, 2022, 39 pages.
Notice of Allowance issued in U.S. Appl. No. 16/322,811, dated Apr. 19, 2022, 11 pages.
Notice of Allowance issued in U.S. Appl. No. 16/964,943, dated Jan. 11, 2022, 8 pages.
Korean Official Action issued in related Korean Patent Application Serial No. 10-2020-7022307, dated Nov. 26, 2021 with translation, 13 pages.
Official Action issued in European Patent Application Serial No. 17841422.3, dated Feb. 15, 2022, 5 pages.
Chinese Official Action issued in related Chinese Patent Application Serial No. 201980010219.0, dated Apr. 18, 2022 with translation, 17 pages.
Chinese Official Action issued in related Chinese Patent Application Serial No. 202080011045.2, dated Oct. 23, 2023 with translation, 8 pages.
European Official Action issued in related European Patent Application Serial No. 23191029.0, dated Oct. 10, 2023 (9 pages).
Korean Official Action issued in related Korean Patent Application Serial No. 10-2021-7005133, dated Oct. 17, 2023 with translation, 11 pages.
Official Action issued in related U.S. Appl. No. 17/433,561, dated Oct. 27, 2023, 15 pages.
Chinese Official Action issued in related Chinese Patent Application Serial No. 202080018532.1, dated Feb. 17, 2023 with translation, 7 pages.
Chinese Official Action issued in related Chinese Patent Application Serial No. 202080010580.6, dated Mar. 17, 2023 with translation, 12 pages.
Chinese Official Action issued in related Chinese Patent Application Serial No. 202080010580.6, dated Aug. 31, 2023 with translation, 10 pages.
Chinese Official Action issued in related Chinese Patent Application Serial No. 202080011045.2, dated Jul. 14, 2023 with translation, 10 pages.
European Official Action issued in related European Patent Application Serial No. 19748058.5, dated Mar. 17, 2023 (5 pages).
Second Office Action issued in Chinese Patent Appln. Serial No. 202080011045.2, dated Apr. 20, 2023, with English translation, 10 pages.

(56) References Cited

OTHER PUBLICATIONS

Office Action issued in U.S. Appl. No. 17/425,281, dated May 12, 2023, 10 pages.
Office Action issued in U.S. Appl. No. 17/433,561, dated Jul. 13, 2023, 10 pages.
Korean Official Action issued in related Korean Patent Application Serial No. 10-2021-7025489, dated Jun. 13, 2023 with translation, 12 pages.
Korean Official Action issued in related Korean Patent Application Serial No. 10-2021-7005133, dated Apr. 20, 2023 with translation, 9 pages.
Korean Official Action issued in related Korean Patent Application Serial No. 10-2021-7025490, dated Jun. 13, 2023 with translation, 11 pages.
Korean Official Action issued in related Korean Patent Application Serial No. 10-2021-7025877, dated Jun. 1, 2023 with translation, 11 pages.
Korean Official Action issued in related Korean Patent Application Serial No. 10-2021-7025876, dated May 25, 2023 with translation, 9 pages.
Korean Official Action issued in related Korean Patent Application Serial No. 10-2021-7029798, dated Jul. 7, 2023 with translation, 10 pages.
Official Action issued in related U.S. Appl. No. 16/969,175, dated Aug. 1, 2023, 6 pages.
Official Action issued in related U.S. Appl. No. 17/424,850, dated Sep. 14, 2023, 9 pages.
Official Action issued in related U.S. Appl. No. 17/425,277, dated Sep. 21, 2023, 10 pages.
Office Action issued in U.S. Appl. No. 17/425,277, dated Mar. 13, 2023, 13 pages.
Office Action issued in U.S. Appl. No. 17/433,561, dated Mar. 27, 2023, 8 pages.
European Search Report issued in related European Application No. 24157823.6, dated Jun. 13, 2024, 6 pages.
Official Action issued in related U.S. Appl. No. 17/433,561, dated Jun. 14, 2024, 9 pages.
Official Action issued in related U.S. Appl. No. 17/425,277, dated May 31, 2024, 14 pages.
U.S. Appl. No. 16/959,105, filed Jun. 29, 2020, Imura.
U.S. Appl. No. 16/964,943, filed Jul. 24, 2020, Imura et al.
U.S. Appl. No. 17/424,847, filed Jul. 21, 2021, Hashimoto et al.
U.S. Appl. No. 17/424,850, filed Jul. 21, 2021, Ou et al.
U.S. Appl. No. 17/425,277, filed Jul. 22, 2021, Imura et al.
U.S. Appl. No. 17/425,281, filed Jul. 22, 2021, Suzuki.
U.S. Appl. No. 17/433,561, filed Aug. 24, 2021, Miyazaki et al.
Official Action issued in related U.S. Appl. No. 17/433,561, dated Sep. 18, 2024, 12 pages.
Notice of Allowance issued in U.S. Appl. No. 17/425,277, dated Sep. 25, 2024, 11 pages.

\* cited by examiner

ROTATIONAL DIRECTION OF ROTATING SEAL RING

A-A CROSS-SECTIONAL VIEW

Fig. 5
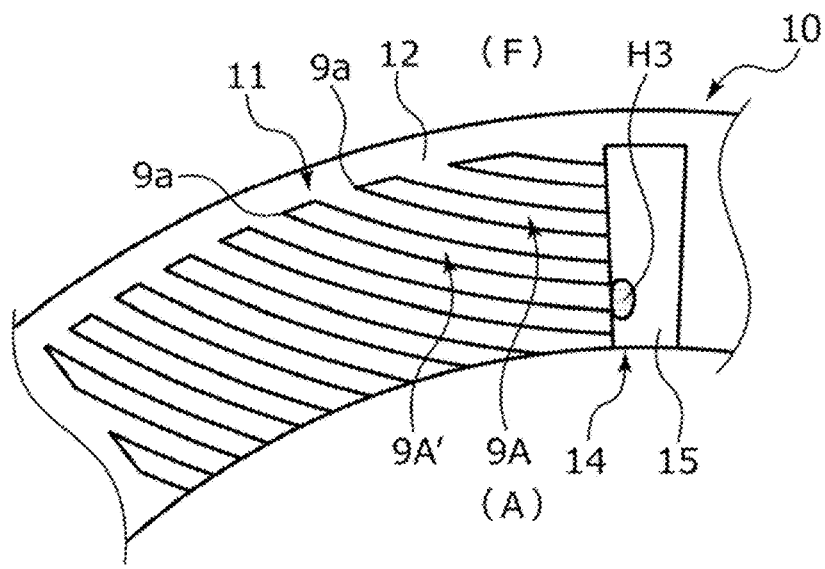
(a)
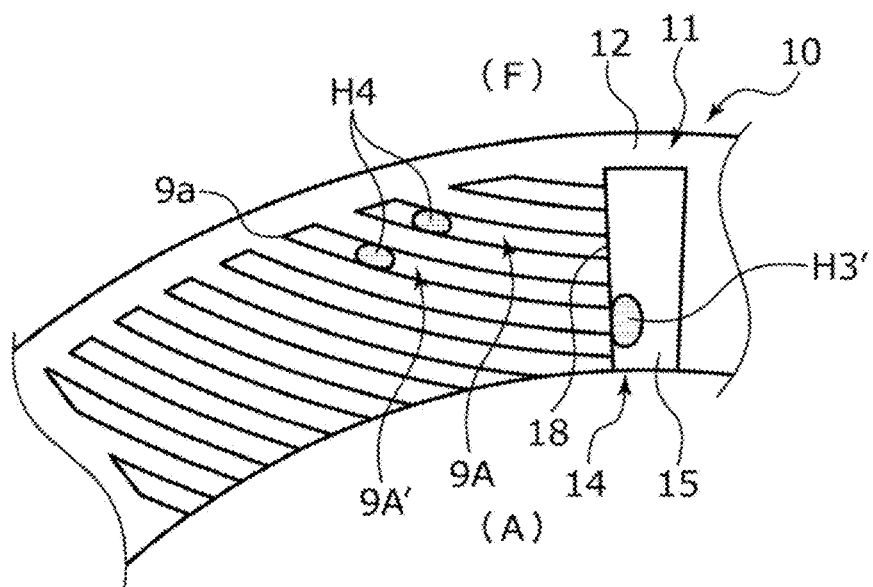
(b)
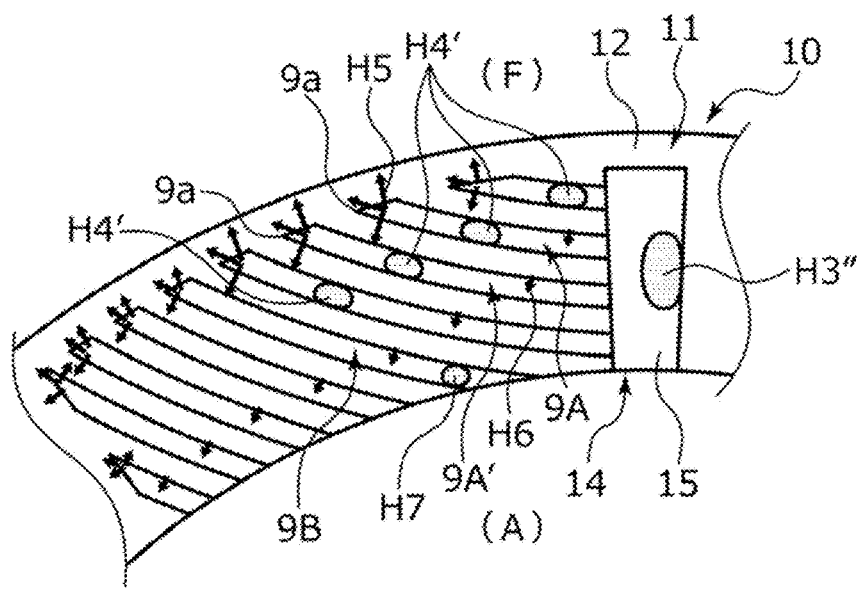
(c)

Fig. 7  ROTATIONAL DIRECTION OF ROTATING SEAL RING

Fig. 8 ROTATIONAL DIRECTION OF ROTATING SEAL RING

Fig. 9 (a)
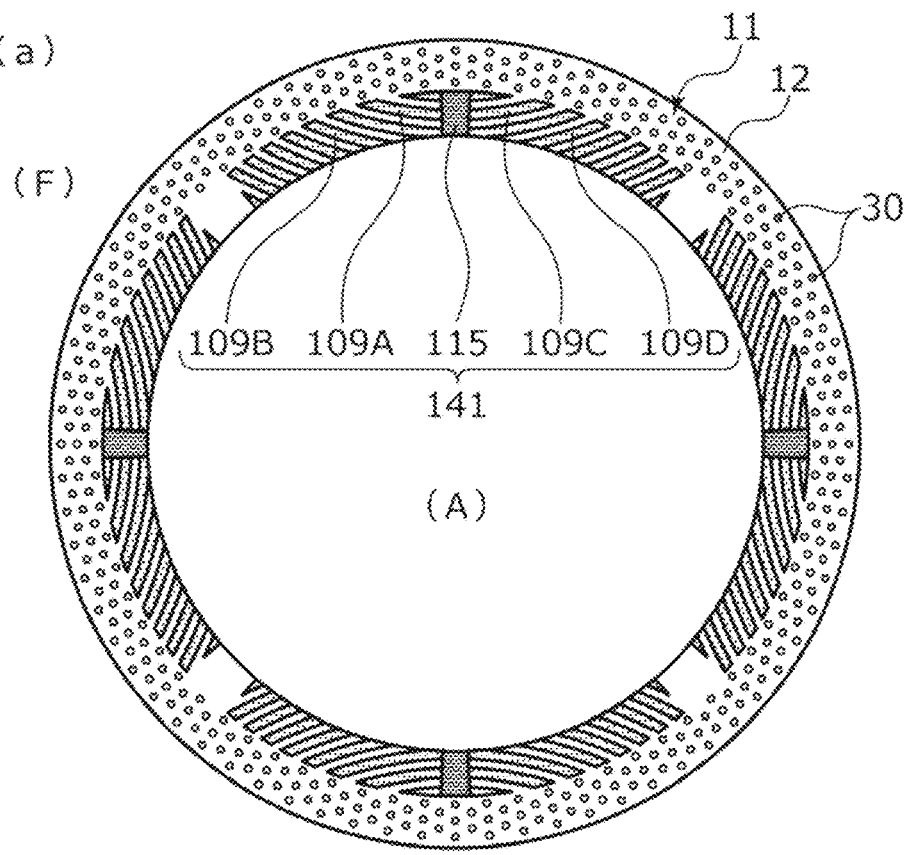
(b)
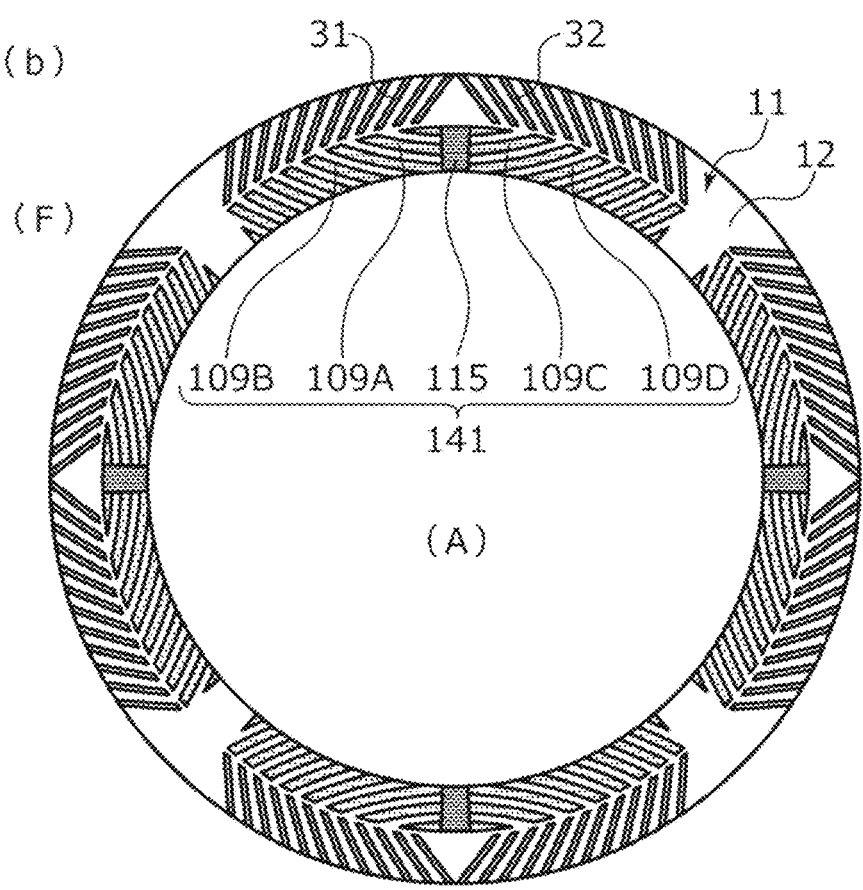

SLIDING COMPONENT

TECHNICAL FIELD

The present invention relates to a sliding component that is subjected to relative rotation, for example, a sliding component used in a seal device that seals a rotating shaft of a rotary machine in an automobile, a general industrial machine, or other sealing fields, or a sliding component used in a bearing of an automobile, a general industrial machine, or a machine in other bearing fields.

BACKGROUND ART

As a seal device that prevents leakage of a sealed liquid, for example, there is a mechanical seal including a pair of sliding components which have an annular shape and rotate relative to each other to cause sliding surfaces to slide against each other. In such a mechanical seal, in recent years, there has been a desire that energy lost by sliding is reduced for environmental measures, and the sliding surface of the sliding component is provided with a positive pressure generating groove communicating with an outer diameter side which is a sealed liquid side of a high pressure, and having a closed one end in the sliding surface. Accordingly, when the sliding components rotate relative to each other, a positive pressure is generated in the positive pressure generating groove to separate the sliding surfaces from each other, and the sealed liquid is introduced into the positive pressure generating groove from the outer diameter side to be held therein. Therefore, the lubricity is improved, and the friction is reduced.

Further, in order to maintain sealability for a long period of time, the mechanical seal is required to satisfy a condition such as "sealing" in addition to "lubrication". For example, in a mechanical seal described in Patent Citation 1, one sliding component is provided with a Rayleigh step and a reverse Rayleigh step that communicate with a sealed liquid side. Accordingly, when sliding components rotate relative to each other, a positive pressure is generated between sliding surfaces by the Rayleigh step, to separate the sliding surfaces from each other, and the Rayleigh step holds a sealed liquid. Therefore, the lubricity is improved. Meanwhile, since a relatively negative pressure is generated in the reverse Rayleigh step, and the reverse Rayleigh step is disposed closer to a leakage side than the Rayleigh step, the sealed liquid of a high pressure which has flowed out from the Rayleigh step to a gap between the sliding surfaces can be suctioned into the reverse Rayleigh step. In such a manner, the sealed liquid between a pair of the sliding components is prevented from leaking to the leakage side, so that the sealability is improved.

CITATION LIST

Patent Literature

Patent Citation 1: WO 2012/046749 A (pages 14 to 16 and FIG. 1)

SUMMARY OF INVENTION

Technical Problem

However, in Patent Citation 1, since a structure where the reverse Rayleigh step causes the sealed liquid to return to the sealed liquid side is adopted, the sealed liquid is not supplied to the leakage side in the gap between the sliding surfaces, and there is a portion which has no contribution to lubricity, which is a problem. Therefore, sliding components having higher lubricity are required.

The present invention has been made in view of such a problem, and an object of the present invention is to provide a sliding component that supplies a sealed fluid to a leakage side in a gap between sliding surfaces to exhibit high lubricity and has a small leakage of the sealed fluid.

Solution to Problem

In order to solve the above problem, according to the present invention, there is provided a sliding component that has an annular shape and is disposed in a place where relative rotation is performed in a rotary machine, including a plurality of dynamic pressure generating mechanisms provided in a sliding surface of the sliding component, each of the dynamic pressure generating mechanisms including a deep groove portion that communicates with a leakage side, and a plurality of shallow groove portions that is shallower than the deep groove portion, at least a part of the shallow groove portions communicating with the deep groove portion and being arranged in a circumferential direction in parallel relationship to each other. According to the aforesaid feature of the present invention, the deep groove portion has a deep groove depth and a large volume, so that a large amount of the sealed fluid supplied to the leakage side of the sliding surface can be recovered, and the sealed fluid can flow out from the shallow groove portions to a gap between sliding surfaces. Therefore, lubricity can be improved over a wide area of the sliding surface. In addition, since the sealed fluid is recovered by the deep groove portion communicating with the leakage side, and the recovered sealed fluid flows out from the shallow groove portions to the gap between the sliding surfaces to partly return to a sealed fluid side in a radial direction, the amount of the sealed fluid leaking to the leakage side is small. In addition, since in the plurality of shallow groove portions arranged in parallel, the sealed fluid flowing out from the shallow groove portion on the sealed fluid side can be trapped by the shallow groove portion disposed in parallel on the leakage side, the lubricity can be improved, and the amount of the sealed fluid leaking to the leakage side can be further reduced.

It may be preferable that the shallow groove portions extend toward a sealed fluid side. According to this preferable configuration, a high-pressure portion in which a high pressure is generated in an end portion in an extending direction of each of the shallow groove portions due to dynamic pressure can be disposed close to the sealed fluid side, so that the sealed fluid can return from the end portion in the extending direction of each of the shallow groove portions to a position which is close to the sealed fluid side between the sliding surfaces.

It may be preferable that the shallow groove portions toward the leakage side are be curved in the circumferential direction. According to this preferable configuration, dynamic pressure can be adjusted according to the curvature of the shallow groove portions. In addition, since the distance to the end portion in the extending direction of each of the shallow groove portions can be increased, a large pressure can be obtained.

It may be preferable that each of each of the dynamic pressure generating mechanisms includes sub-shallow groove portions that directly communicate with the leakage side, are arranged in the circumferential direction in parallel relationship to each other on the leakage side of the shallow groove portions, and are independent of the shallow groove portions. According to this preferable configuration, in the plurality of shallow groove portions communicating with the deep groove portion, the sealed fluid flowing out from the end portions in the extending directions can be further trapped by the sub-shallow groove portions on the leakage side. Therefore, the amount of the sealed fluid leaking to the leakage side can be further reduced. In addition, since the amount of introduction of the sealed fluid into the sub-shallow groove portions which do not communicate with the deep groove portion can be increased, the effective range of the dynamic pressure generating mechanism can be widened.

It may be preferable that the shallow groove portions extend from both sides of the deep groove portion in the circumferential direction. According to this preferable configuration, the shallow groove portion which is disposed on one side in the circumferential direction of the deep groove portion can be used as a shallow groove portion for generating dynamic pressure. Therefore, the shallow groove portions can be used without being limited by the relative rotational direction of the sliding component.

It may be preferable that the deep groove portion communicates with an inner diameter side. According to this preferable configuration, the sealed fluid which has been supplied from the shallow groove portion to the gap between the sliding surfaces can return to the sealed fluid side due to centrifugal force, and the sealed fluid is easily held in the deep groove portion due to centrifugal force.

It may be preferable that the sliding surface of the sliding component is provided with at least one specific dynamic pressure generating mechanism that is disposed closer to a sealed fluid side than the dynamic pressure generating mechanism and is independent of the dynamic pressure generating mechanism. According to this preferable configuration, during relative rotation of the sliding component, while the specific dynamic pressure generating mechanism separates the sliding surfaces from each other to form an appropriate fluid film between the sliding surfaces, the amount of leakage of the sealed fluid to the leakage side can be reduced by the dynamic pressure generating mechanism.

Incidentally, the fact that the shallow groove portion of the sliding component according to the present invention extends in the circumferential direction means that the shallow groove portion may extend with at least a component in the circumferential direction, preferably, may extend such that the component along the circumferential direction is larger than the component in the radial direction. In addition, the fact that the deep groove portion extends in the radial direction means that the deep groove portion may extend with at least a component in the radial direction, preferably, may extend such that the component along the radial direction is larger than the component in the circumferential direction.

In addition, the sealed fluid may be a liquid, or have a mist form in which a liquid and a gas are mixed.

BRIEF DESCRIPTION OF DRAWINGS

FIGS. 5A to 5C are schematic views describing an operation in which a sealed liquid which is suctioned from an inner diameter side of a liquid guide groove portion at an initial stage of relative rotation flows out to a gap between sliding surfaces in the first embodiment.

FIG. 9A is a description view illustrating a first modification example of the third embodiment of the present invention, and FIG. 9B is a description view illustrating a second modification example of the third embodiment of the present invention.

DESCRIPTION OF EMBODIMENTS

Figure 1:
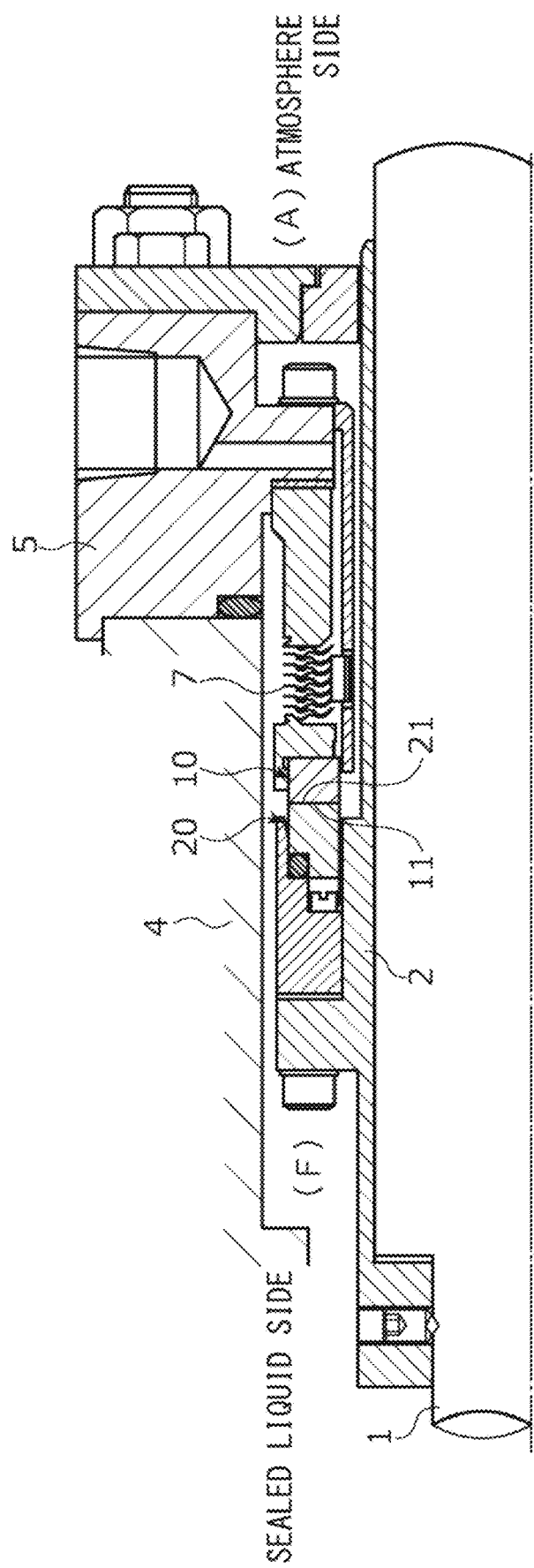
FIG. 1 is a longitudinal cross-sectional view illustrating one example of a mechanical seal including a sliding component according to a first embodiment of the present invention.

Modes for implementing a sliding component according to the present invention will be described below based on embodiments.

First Embodiment

A sliding component according to a first embodiment of the present invention will be described with reference to FIGS. 1 to 6. Incidentally, in the present embodiment, a mode in which the sliding component forming a mechanical seal will be described as an example. In addition, a description will be given based on the premise that an outer diameter side of the sliding component forming the mechanical seal is a sealed liquid side (i.e., a high-pressure side) as a sealed fluid side and an inner diameter side is an atmosphere side (i.e., a low-pressure side) as a leakage side. In addition, for convenience of description, in the drawings, dots may be added to a groove and the like formed in a sliding surface.

A mechanical seal for a general industrial machine illustrated in FIG. 1 is an inside mechanical seal that seals a sealed liquid F which tends to leak from an outer diameter side of sliding surfaces toward an inner diameter side, and mainly includes a rotating seal ring 20 which is a sliding component that has an annular shape and is provided on a rotating shaft 1 with a sleeve 2 interposed therebetween, to be integrally rotatable together with the rotating shaft 1, and a stationary seal ring 10 that has an annular shape and is a sliding component which is provided on a seal cover 5 fixed to a housing 4 of a mounted apparatus, to not be rotated but be movable in an axial direction. The stationary seal ring 10 is biased in the axial direction by a bellows 7, so that a sliding surface 11 of the stationary seal ring 10 and a sliding surface 21 of the rotating seal ring 20 slide against each other in close contact with each other. Incidentally, the sliding surface 21 of the rotating seal ring 20 is a flat surface, and a recessed portion is not provided in the flat surface.

The stationary seal ring 10 and the rotating seal ring 20 are representatively made of SiC (as an example of hard material) or a combination of SiC (as the example of hard material) and carbon (as an example of soft material); the sliding material is not limited thereto, and any type of sliding material is applicable as long as the sliding material is used as a sliding material for a mechanical seal. Incidentally, as the SiC, there are materials consisting of different components and compositions of two or more phases including a sintered body in which boron, aluminum, carbon, or the like is used as a sintering additive, for example, reaction-sintered SiC, SiC—TiC, SiC—TiN, and the like consisting of Sic or SiC and Si in which graphite particles are dispersed. As the carbon, resin molded carbon, sintered carbon, and the like carbon including carbon in which a carbonaceous material and a graphite material are mixed can be used. In addition, in addition to the above sliding materials, metallic materials, resin materials, surface modifiers (e.g., coating materials), composite materials, or the like are also applicable.

Figure 2:
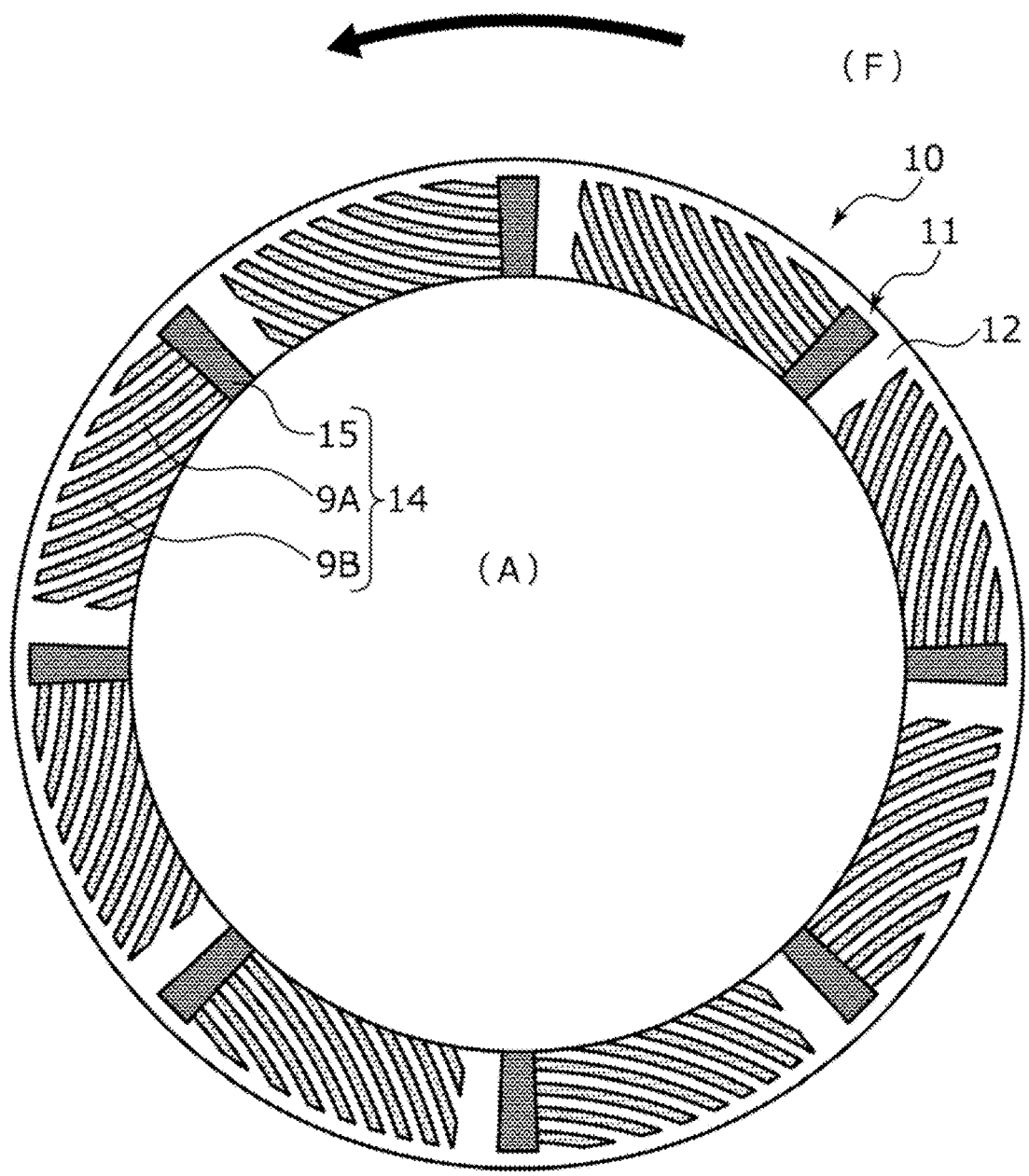
FIG. 2 is a view of a sliding surface of a stationary seal ring when seen in an axial direction.

As illustrated in FIG. 2, the rotating seal ring 20 slides relative to the stationary seal ring 10 as indicated by an arrow, and a plurality of dynamic pressure generating mechanisms 14 are evenly provided in the sliding surface 11 of the stationary seal ring 10 in a circumferential direction of the stationary seal ring 10. A portion of the sliding surface 11 other than the dynamic pressure generating mechanisms 14 is a land 12 forming a flat surface.

Figure 3:
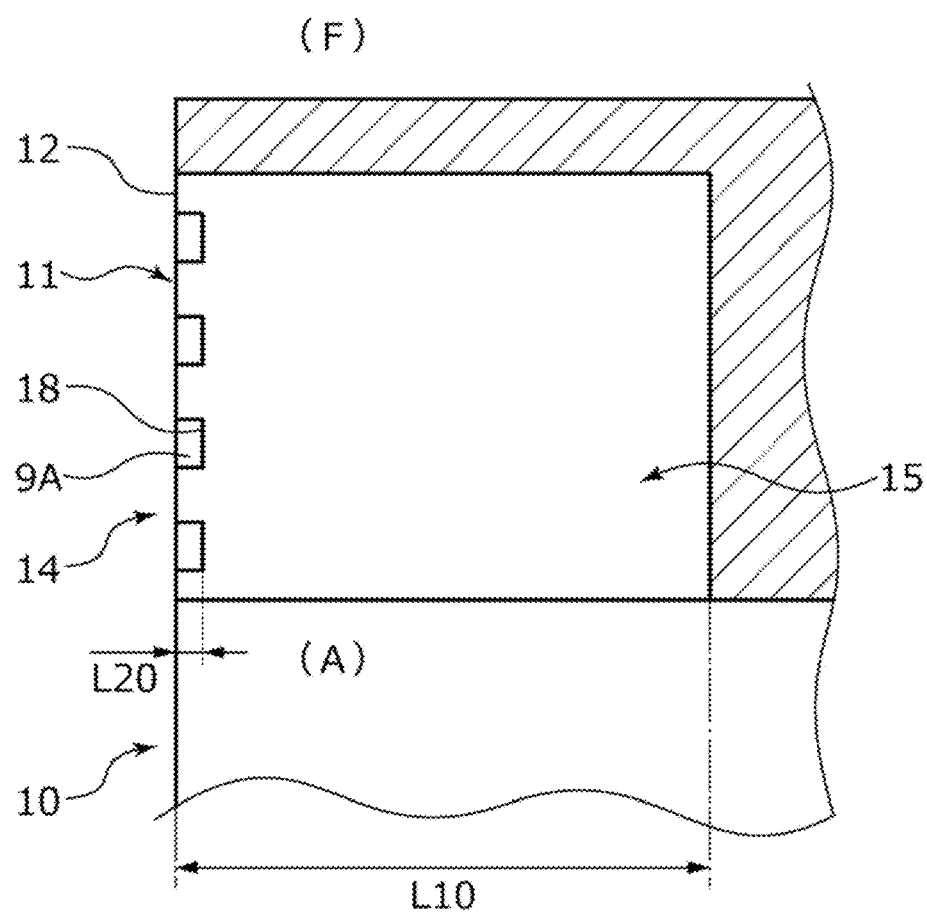
FIG. 3 is an A-A cross-sectional view of FIG. 2.
Figure 4:
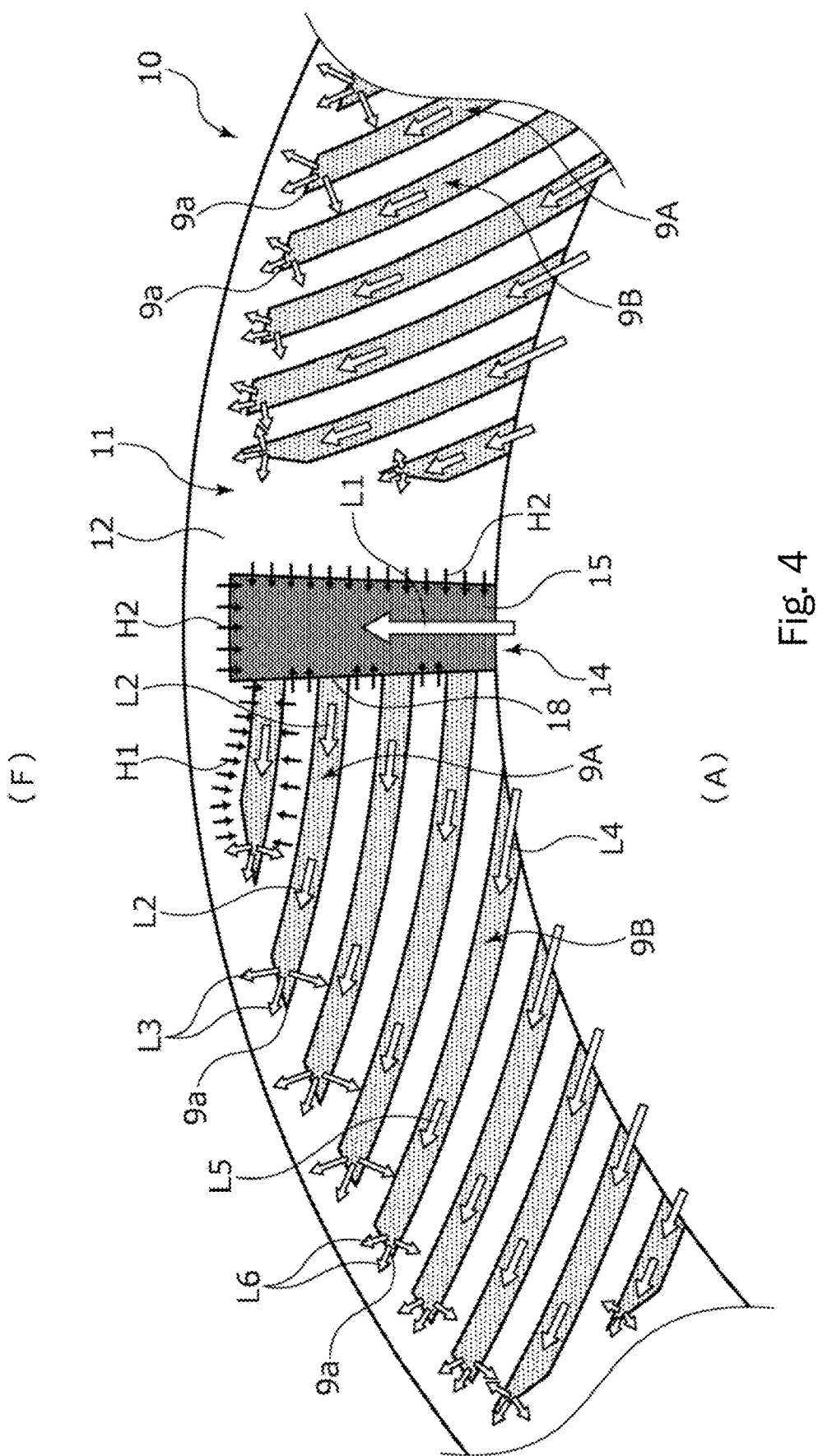
FIG. 4 is a main part enlarged view of the sliding surface of the stationary seal ring in the first embodiment.

Next, an outline of the dynamic pressure generating mechanism 14 will be described based on FIGS. 2 to 4. Incidentally, hereinafter, a description will be given based on the premise that when the stationary seal ring 10 and the rotating seal ring 20 rotate relative to each other, the left side of the drawing sheet of FIG. 4 is a downstream side of the sealed liquid F flowing in spiral grooves 9A and 9B to be described later, and the right side of the drawing sheet of FIG. 4 is an upstream side of the sealed liquid F flowing in the spiral grooves 9A and 9B.

The dynamic pressure generating mechanism 14 includes a liquid guide groove portion 15 as a deep groove portion that communicates with the atmosphere side and extends in an outer diameter direction, a plurality of the spiral grooves 9A as shallow groove portions that extend in parallel from the liquid guide groove portion 15 toward the downstream side in the circumferential direction, and a plurality of the spiral grooves 9B as sub-shallow groove portions that communicate with the atmosphere side on the inner diameter side of the spiral grooves 9A, extend in parallel to the spiral grooves 9A in the circumferential direction, and are independent of the spiral grooves 9A. Incidentally, the liquid guide groove portion 15 of the first embodiment extends in a radial direction to be orthogonal to an axis of the stationary seal ring 10. In addition, four spiral grooves 9A and five spiral grooves 9B of the first embodiment are arranged in parallel at equal intervals in a region having a band shape which extends from the liquid guide groove portion 15 toward the downstream side in the circumferential direction such that the region has the same width in the radial direction as that of the liquid guide groove portion 15 and is concentric with the stationary seal ring 10. In addition, the liquid guide groove portion 15 and the spiral groove 9A communicate with each other, and a step 18 in a depth direction is formed in a communication portion.

In addition, a wall portion 9a having a tapered shape is formed in an end portion in an extending direction, namely, an end portion on the downstream side of each of the spiral grooves 9A and 9B. Incidentally, the wall portion 9a is not limited to being tapered, for example, may be orthogonal or inclined with respect to a rotational direction or may be formed in a step shape.

In addition, a depth dimension L10 of the liquid guide groove portion 15 is larger than a depth dimension L20 of the spiral groove 9A (i.e., L10>L20). Specifically, in the first embodiment, the depth dimension L10 of the liquid guide groove portion 15 is 100 μm, and the depth dimension L20 of the spiral groove 9A is 5 μm. Namely, the step 18 in the depth direction is formed between the liquid guide groove portion 15 and the spiral groove 9A by a side surface on the downstream side of the liquid guide groove portion 15 and a bottom surface of the spiral groove 9A. Incidentally, as long as the depth dimension of the liquid guide groove portion 15 is larger than the depth dimension of the spiral groove 9A, the depth dimensions of the liquid guide groove portion 15 and the spiral groove 9A can be freely changed, and it is preferable that the dimension L10 is five times or more the dimension L20. In addition, for convenience of description, the spiral groove 9B is formed with the same depth dimension L20 (e.g., 5 μm) as that of the spiral groove 9A.

Incidentally, the bottom surfaces of the spiral grooves 9A and 9B are flat surfaces and are formed in parallel to the land 12; however, the flat surfaces are not prevented from being provided with a fine recessed portion or being formed to be inclined with respect to the land 12. Further, two arc-shaped surfaces of each of the spiral grooves 9A and 9B are orthogonal to the bottom surface of each of the spiral grooves 9A and 9B, the two arc-shaped surfaces extending in the circumferential direction. In addition, a bottom surface of the liquid guide groove portion 15 is a flat surface and is formed in parallel to the land 12; however, the flat surface is not prevented from being provided with a fine recessed portion or being formed to be inclined with respect to the land 12. Further, each of two flat surfaces of the liquid guide groove portion 15 is orthogonal to the bottom surface of the liquid guide groove portion 15, the two flat surfaces extending in the radial direction.

Next, the operation during relative rotation of the stationary seal ring 10 and the rotating seal ring 20 will be described. First, during non-operation of the general industrial machine, namely, when the rotating seal ring 20 does not rotate, a slight amount of the sealed liquid F on the outer diameter side of the sliding surfaces 11 and 21 enters a gap between the sliding surfaces 11 and 21 due to the capillary phenomenon, and in the dynamic pressure generating mechanism 14, the sealed liquid F which has remained during stop of the general industrial machine and the atmosphere which has entered from the inner diameter side of the sliding surfaces 11 and 21 are mixed. Incidentally, since the sealed liquid F has a higher viscosity than a gas, the amount of leakage from the dynamic pressure generating mechanism 14 to a low-pressure side during stop of the general industrial machine is small.

In a case where almost no sealed liquid F remains in the dynamic pressure generating mechanism 14 during stop of the general industrial machine, when the rotating seal ring 20 rotates relative to the stationary seal ring 10 (refer to the black arrow of FIG. 2), as illustrated in FIG. 4, a low-pressure side fluid A on the atmosphere side is introduced from the liquid guide groove portion 15 as indicated by an arrow L1, and the spiral groove 9A causes the low-pressure side fluid A to move in a following manner in the rotational direction of the rotating seal ring 20 as indicated by an arrow L2, so that dynamic pressure is generated in the spiral groove 9A. In addition, since the low-pressure side fluid A on the atmosphere side is introduced also from an opening on the low-pressure side of the spiral groove 9B as indicated by an arrow L4, and the spiral groove 9B causes the low-pressure side fluid A to move in a following manner in the rotational direction of the rotating seal ring 20 as indicated by an arrow L5, dynamic pressure is generated also in the spiral groove 9B.

The pressure is the highest in the vicinities of the wall portions 9a which are the end portions on the downstream side of the spiral grooves 9A and 9B, so that the low-pressure side fluid A flows out from the vicinities of the wall portions 9a to the peripheries thereof as indicated by arrows L3 and L6. Incidentally, the pressure decreases gradually as the upstream side of the spiral grooves 9A and 9B is approached.

In addition, when the stationary seal ring 10 and the rotating seal ring 20 rotate relative to each other, the sealed liquid F of a high pressure flows into the gap between the sliding surfaces 11 and 21 from the outer diameter side thereof at all times to perform so-called fluid lubrication. At this time, since the pressure of the sealed liquid F in the vicinities of the spiral grooves 9A and 9B, as described above, particularly on the downstream side of the spiral grooves 9A and 9B is high, as indicated by an arrow H1, the sealed liquid F remains located on the land 12 to hardly enter the spiral grooves 9A and 9B. On the other hand, since the liquid guide groove portion 15 is a deep groove portion and communicates with the low-pressure side, as indicated by an arrow H2, the sealed liquid F in the vicinity of the liquid guide groove portion 15 easily enters the liquid guide groove portion 15. In addition, since the sealed liquid F is a liquid and has large surface tension, the sealed liquid F moves along side wall surfaces of the liquid guide groove portion 15 to easily enter the liquid guide groove portion 15. Incidentally, for convenience of description, the arrow H1 is illustrated only for the spiral groove 9A on the outermost diameter side.

In addition, as indicated by the arrow L3, the low-pressure side fluid A flows out from the vicinity of the wall portion 9a, which is the end portion on the downstream side of the spiral groove 9A on the high-pressure side, to the periphery thereof to push a part of the sealed liquid F which is located on the land 12 between the spiral groove 9A, which is disposed in parallel on the low-pressure side, and the spiral groove 9A on the high-pressure side, so that the part of the sealed liquid F enters the spiral groove 9A on the low-pressure side which extends in parallel to the periphery of the wall portion 9a of the spiral groove 9A on the high-pressure side. Incidentally, such the pushing of the sealed liquid F by the low-pressure side fluid A is not limited to being performed between the spiral grooves 9A and 9A arranged in parallel as illustrated in FIG. 4, and as indicated by the arrows L3 and L6, similarly, the low-pressure side fluid A flowing out from the wall portion 9a of each of the spiral grooves 9A and 9B to the vicinity thereof performs pushing also between the other spiral grooves 9A and 9B or the other spiral grooves 9B and 9B arranged in parallel.

Next, an operation in which the sealed liquid F suctioned into the liquid guide groove portion 15 flows out to the gap between the sliding surfaces 11 and 21 will be described.

In a case where almost no sealed liquid F remains in the dynamic pressure generating mechanism 14, when the rotating seal ring 20 rotates relative to the stationary seal ring 10 (refer to the black arrow of FIG. 2), as illustrated in FIG. 5A, the sealed liquid F which has entered the liquid guide groove portion 15 becomes an agglomerated droplet as indicated by reference sign H3. Thereafter, as illustrated in FIG. 5B, when the droplet reaches a certain volume, as indicated by reference sign H4, the droplet is suctioned into the spiral grooves 9A and 9A' due to a relatively low pressure formed on the upstream side of the spiral grooves 9A and 9A'. At the same time, the sealed liquid F newly enters the liquid guide groove portion 15 to become a droplet H3'. At this time, the sealed liquid F of a larger amount than the amount at an initial stage of the relative rotation in FIG. 5A enters the liquid guide groove portion 15.

Thereafter, as illustrated in FIG. 5C, the sealed liquid F suctioned into the spiral grooves 9A and 9A' receives a large shearing force from the rotating seal ring 20 to move to the downstream side in the spiral grooves 9A and 9A' while the pressure increases, as indicated by an arrow H5, to flow out from the vicinities of the wall portions 9a to the peripheries thereof. In addition, a part of the sealed liquid F which has flowed out form the vicinities of the wall portions 9a to the peripheries thereof enters the spiral groove 9A on the low-pressure side, as indicated by arrow H6, together with a part of the sealed liquid F located on the land 12 between the spiral groove 9A' and the spiral groove 9A disposed in parallel on the low-pressure side. At the same time, the sealed liquid F newly enters the liquid guide groove portion 15 to become a droplet H3''', and as indicated by reference sign H4', the droplet H3' is suctioned into each of the spiral grooves 9A. In addition, the sealed liquid F enters also from the opening of the spiral groove 9B to become a droplet H7. Incidentally, since the amount of the sealed liquid F entering from an opening side of the spiral groove 9B is small, the droplet H7 is a smaller agglomerate than the droplet H4.

Figure 6:
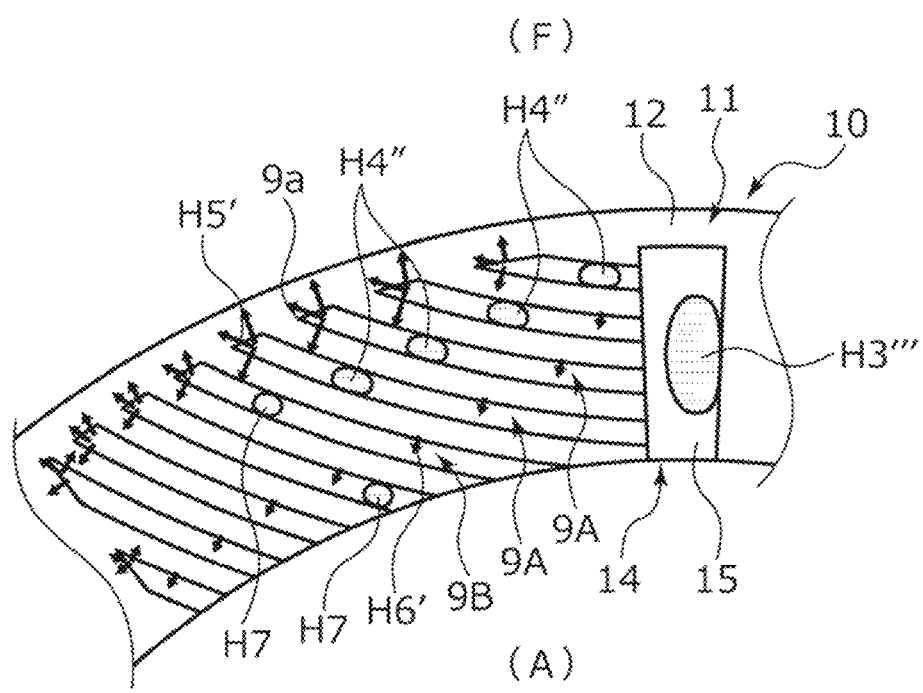
FIG. 6 is a schematic view describing an operation in which the sealed liquid which is suctioned from the inner diameter side of the liquid guide groove portion at the initial stage of relative rotation flows out to the gap between the sliding surfaces in the first embodiment.

As illustrated in FIG. 6, the sealed liquid F suctioned into the spiral grooves 9A and 9A' moves to the downstream side in the spiral grooves 9A and 9A', as indicated by an arrow H5', to flow out from the vicinities of the wall portions 9a to the peripheries thereof. In addition, a part of the sealed liquid F which has flowed out form the vicinities of the wall portions 9a to the peripheries thereof enters the spiral grooves 9A and 9A' or the spiral groove 9B on the low-pressure side, as indicated by the arrow H6, together with a part of the sealed liquid F located on the land 12 between the spiral grooves 9A and 9A' or the spiral grooves 9A' and 9B disposed in parallel on the low-pressure side. At the same time, the sealed liquid F further enters the liquid guide groove portion 15 to become a droplet H3''', and as indicated by reference sign H4'', the droplet H3'' is suctioned into each of the spiral grooves 9A.

Thereafter, the amount of the sealed liquid F entering the liquid guide groove portion 15 is further increased than in the state illustrated in FIG. 6, and a steady state where the sealed liquid F flows out continuously from each of the spiral grooves 9A to the gap between the sliding surfaces 11 and 21 is reached. In the steady state, the sealed liquid F of a high pressure flows into the gap between the sliding surfaces 11 and 21 from the outer diameter side thereof or the spiral grooves 9A and 9B to perform fluid lubrication as described above. Incidentally, the time until the steady state is reached via the states of FIGS. 5A to 5C is a transient short time. In addition, when the sealed liquid F remains in the dynamic pressure generating mechanism 14 during stop of the general industrial machine, depending on the amount of the sealed liquid F remaining in the dynamic pressure generating mechanism 14, the operation starts from any one of the state of FIG. 5A, the state of FIG. 5B, the state of FIG. 5C, and the steady state.

Here, since the liquid guide groove portion 15 is a deep groove portion and communicates with the low-pressure side, the sealed liquid F indicated by the arrow H5 is easily suctioned into the liquid guide groove portion 15 adjacent thereto, so that the amount of the sealed liquid F between the sliding surfaces 11 and 21 is stable and high lubricity can be maintained. Incidentally, since the spiral groove 9B is a shallow groove having a depth which is the same to the opening side, even in the steady state, the amount of the sealed liquid F entering from the opening side of the spiral groove 9B is not larger than the amount of the sealed liquid F entering the liquid guide groove portion 15. In addition, since a liquid has a larger interfacial tension for a solid than a gas, the sealed liquid F is easily held between the sliding surfaces 11 and 21, and the atmosphere is easily discharged to the inner diameter side of the stationary seal ring 10 and the rotating seal ring 20.

As described above, when the stationary seal ring 10 and the rotating seal ring 20 rotate relative to each other, the sealed liquid F which has entered the liquid guide groove portion 15 is suctioned into the spiral grooves 9A, so that dynamic pressure is generated therein. Since the liquid guide groove portion 15 has a deep groove depth and a large volume, even when the sealed liquid F is supplied to the low-pressure side of the sliding surface 11, the sealed liquid F is recovered and returned from the spiral grooves 9A to the gap between the sliding surfaces 11 and 21. Therefore, the lubricity can be improved over a wide area of the sliding surface 11. In addition, the sealed liquid F is recovered by the liquid guide groove portion 15 communicating with the low-pressure side on the inner diameter side of the sliding surfaces 11 and 21, and the sealed liquid F which is recovered flows out from the spiral grooves 9A to the gap between the sliding surfaces 11 and 21 to partly return to the high-pressure side. Therefore, the amount of the sealed liquid F leaking to the low-pressure side is small. In addition, since the end portion on the downstream side of the spiral groove 9A has a tapered shape, the flow rate of the sealed liquid F returning from the wall portion 9a of the spiral groove 9A to the gap between the sliding surfaces 11 and 21 is easily secured. Therefore, dynamic pressure can be stably generated. In addition, since in the plurality of spiral grooves 9A arranged in parallel, the sealed liquid F flowing out from the vicinity of the wall portion 9a of the spiral groove 9A on the high-pressure side to the periphery can be trapped by the spiral groove 9A disposed in parallel on the low-pressure side, the lubricity can be improved, and the amount of the sealed liquid F leaking to the low-pressure side can be further reduced.

Further, since the sealed liquid F flowing out from the vicinities of the wall portions 9a of the plurality of spiral grooves 9A, which communicate with the liquid guide groove portion 15, to the peripheries can be further trapped by the spiral grooves 9B on the low-pressure side, the amount of the sealed liquid F leaking to the low-pressure side can be further reduced. In addition, since the amount of introduction of the sealed liquid F into the spiral grooves 9B which do not communicate with the liquid guide groove portion 15 can be increased, the effective range of the dynamic pressure generating mechanisms 14 in the sliding surface 11 can be widened.

In addition, since a large amount of the sealed liquid F is held in the liquid guide groove portion 15, the amount of the sealed liquid F suctioned into the spiral groove 9A can be sufficiently secured, and even when the amount of the sealed liquid F held in the liquid guide groove portion 15 increases or decreases in a short time, the amount of the sealed liquid F suctioned into the spiral groove 9A can be substantially constant, and the sliding surfaces 11 and 21 can be avoided from being subjected to poor lubrication. In addition, since the liquid guide groove portion 15 communicates with the low-pressure side, the pressure in the liquid guide groove portion 15 is lower than the pressure of the sealed liquid F between the sliding surfaces 11 and 21, and the sealed liquid F in the vicinity of the liquid guide groove portion 15 is easily suctioned into the liquid guide groove portion 15.

In addition, since the spiral grooves 9A and 9B extend toward the high-pressure side, high-pressure portions formed in the wall portions 9a of the spiral grooves 9A and 9B due to dynamic pressure can be disposed close to the high-pressure side, and particularly, the suctioning ability of the spiral groove 9A through the liquid guide groove portion 15 can be increased. In addition, since the sealed liquid F can return from the wall portions 9a of the spiral grooves 9A and 9B to a position which is close to the high-pressure side between the sliding surfaces 11 and 21, a leakage of the sealed liquid F can be reduced.

In addition, since the spiral grooves 9A and 9B are curved in the circumferential direction, dynamic pressure can be adjusted according to the curvature of the spiral grooves 9A and 9B. In addition, since the distances to the wall portions 9a of the spiral grooves 9A and 9B can be increased, a large pressure can be obtained. Incidentally, the spiral grooves 9A and 9B may be formed at different curvatures.

In addition, the liquid guide groove portion 15 extends in the radial direction. Specifically, since the liquid guide groove portion 15 extends in a direction orthogonal to a center axis of the stationary seal ring 10, the width in the circumferential direction of the liquid guide groove portion 15 is shortened, so that a large number of the liquid guide groove portions 15 can be disposed in the circumferential direction of the stationary seal ring 10. Therefore, the degree of freedom in design is high. Incidentally, the liquid guide groove portion 15 is not limited to extending in the direction orthogonal to the center axis of the stationary seal ring 10, and may be inclined from a position orthogonal to the center axis of the stationary seal ring 10. It is preferable that the inclination is less than 45 degrees. Further, the shape of the liquid guide groove portion 15 can be freely changed to an arc shape or the like.

In addition, since the step 18 is formed in the communication portion between the spiral groove 9A and the liquid guide groove portion 15 by the side surface on the downstream side of the liquid guide groove portion 15 and the bottom surface of the spiral groove 9A, the sealed liquid F can be held in the liquid guide groove portion 15 without being directly affected by dynamic pressure.

In addition, since the spiral grooves 9A each communicate with the liquid guide groove portion 15 over the entire width in the radial direction, an opening region of each of the spiral grooves 9A to the liquid guide groove portion 15 can be secured, and the sealed liquid F held in the liquid guide groove portion 15 can be efficiently suctioned up.

In addition, the liquid guide groove portion 15 communicates with the inner diameter side of the stationary seal ring 10. Namely, the sliding component is an inside mechanical seal, and when the stationary seal ring 10 and the rotating seal ring 20 rotate relative to each other, the sealed liquid F in the spiral groove 9A can return to the high-pressure side due to centrifugal force, and a leakage of the sealed liquid F to the low-pressure side on the inner diameter side of the sliding surfaces 11 and 21 can be reduced.

In addition, since the dynamic pressure generating mechanism 14 is provided in the stationary seal ring 10, when the stationary seal ring 10 and the rotating seal ring 20 rotate relative to each other, the state inside the liquid guide groove portion 15 is easily kept close to atmospheric pressure.

Incidentally, in the first embodiment, the step may not be provided in the communication portion between the liquid guide groove portion 15 and the spiral groove 9A, for example, the liquid guide groove portion 15 and the spiral groove 9A may communicate with each other through an inclined surface. In this case, for example, a portion having a depth dimension of 5 μm or less can be the spiral groove 9A, and a portion which is deeper than 5 μm can be the liquid guide groove portion 15.

In addition, the spiral grooves 9A and 9B are not limited to being formed in a region having a band shape which extends from the liquid guide groove portion 15 toward the downstream side in the circumferential direction such that the region has the same width in the radial direction as that of the liquid guide groove portion 15 and is concentric with the stationary seal ring 10, and may be formed in a region having another shape such as an arc shape or a trapezoidal shape. In addition, as long as the spiral grooves 9A and 9B extend in parallel, the spiral grooves 9A and 9B may be not formed at equal intervals. In addition, the spiral grooves 9A and 9B may extend linearly from the liquid guide groove portion 15, or may extend in a meandering manner. In addition, the spiral groove 9B may not be provided.

Second Embodiment

Next, a sliding component according to a second embodiment of the present invention will be described with reference to FIG. 7. Incidentally, the description of configurations which are the same as and duplicated from those in the first embodiment will be omitted.

Figure 7:
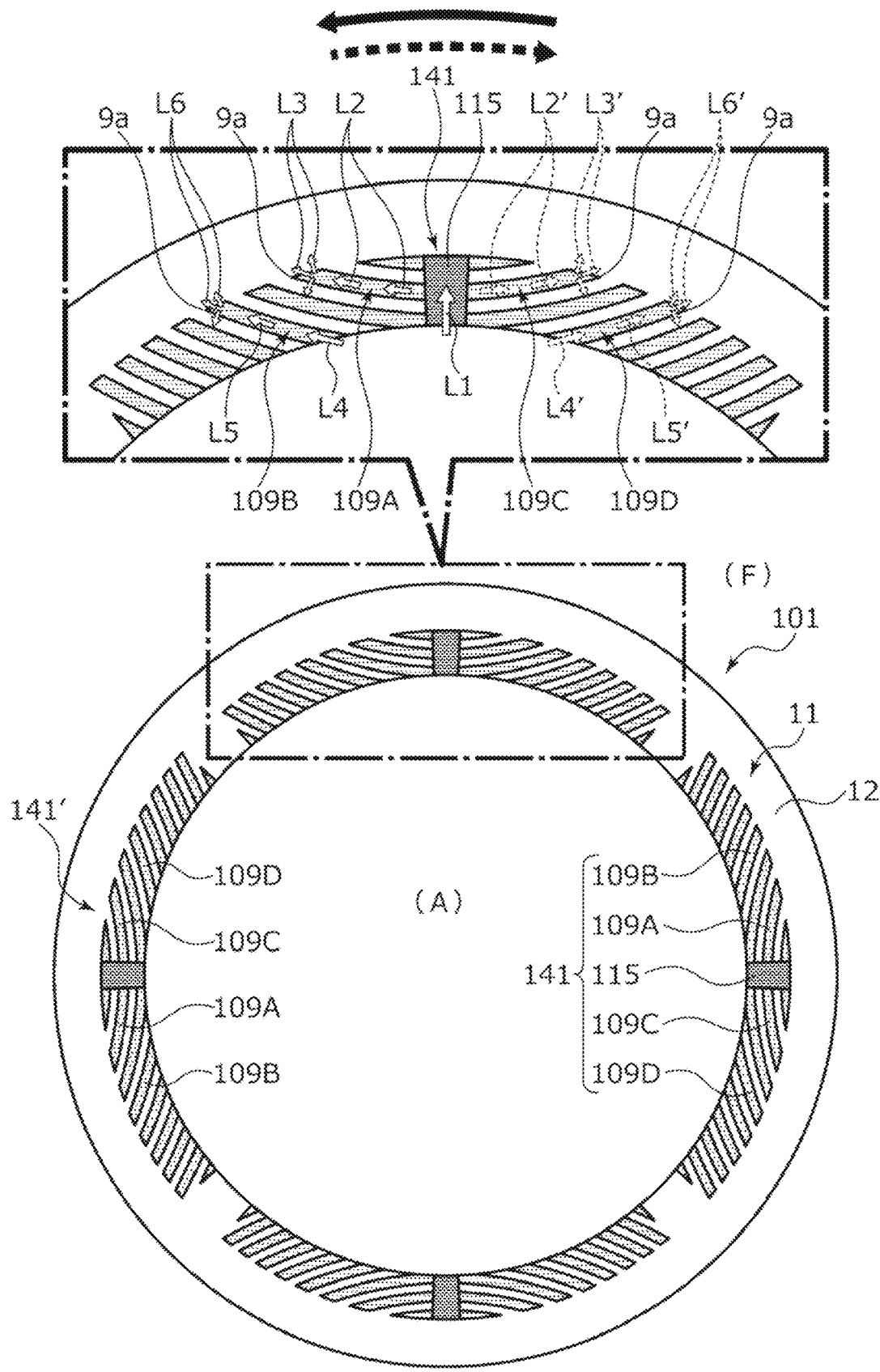
FIG. 7 is a view of a sliding surface of a stationary seal ring as a sliding component according to a second embodiment of the present invention when seen in the axial direction.

As illustrated in FIG. 7, a dynamic pressure generating mechanism 141 provided in a stationary seal ring 101 includes a liquid guide groove portion 115, spiral grooves 109A and 109B, a plurality of spiral grooves 109C as shallow groove portions that extend in parallel from the liquid guide groove portion 115 toward the downstream side in the circumferential direction, and a plurality of spiral grooves 109D as sub-shallow groove portions that communicate with the atmosphere side on the inner diameter side of the spiral grooves 109C, extend in parallel to the spiral grooves 109C in the circumferential direction, and are independent of the spiral grooves 109C. In addition, the spiral grooves 109C and 109D are formed with the same depth dimension of 5 μm as that of the spiral grooves 109A and 109B.

When the rotating seal ring 20 rotates counterclockwise on the drawing sheet of FIG. 7, the low-pressure side fluid A moves in order of arrows L1, L2, and L3 and in order of arrows L4, L5, and L6, so that dynamic pressure is generated in the spiral grooves 109A and 109B. In addition, when the rotating seal ring 20 rotates clockwise on the drawing sheet of FIG. 7, the low-pressure side fluid A moves in order of arrows L1, L2', and L3' and in order of arrows L4', L5', and L6', so that dynamic pressure is generated in the spiral grooves 109C and 109D.

As described above, since the spiral grooves 109A and 109C extend from the liquid guide groove portion 115 to both sides in the circumferential direction, one of the spiral grooves 109A and 109C can be used as a shallow groove portion for generating dynamic pressure. Therefore, the spiral groove 109A or 109C can be used regardless of the relative rotational direction of the stationary seal ring 101 and the rotating seal ring 20. In addition, since one of the spiral grooves 109B and 109D can be also used as a sub-shallow groove portion for generating dynamic pressure, the spiral groove 109B or 109D can be used regardless of the relative rotational direction of the stationary seal ring 101 and the rotating seal ring 20.

In addition, the spiral groove 109B formed in an end portion on the downstream side of the dynamic pressure generating mechanism 141 is adjacent, in the circumferential direction, to the spiral groove 109D formed in an end portion on the upstream side of a dynamic pressure generating mechanism 141' adjacent thereto. Accordingly, the sealed liquid F which flows out from the vicinity of the wall portion 9a of the spiral groove 109B, which is formed on the end portion on the downstream side of the dynamic pressure generating mechanism 141, to the periphery thereof to tend to move to the inner diameter side is suctioned into the spiral groove 109D formed in the end portion on the upstream side of the dynamic pressure generating mechanism 141' adjacent thereto. Therefore, a leakage of the sealed liquid F to the low-pressure side can be reduced.

Incidentally, in the second embodiment, a case where the spiral grooves 109A and 109B and the spiral grooves 109C and 109D have the same depth dimension has been provided as an example; however, the spiral grooves 109A and 109B and the spiral grooves 109C and 109D may be formed with different depth dimensions. In addition, both may be the same or different from each other also in length in the circumferential direction and width in the radial direction.

In addition, the spiral groove 109B formed in the end portion on the downstream side of the dynamic pressure generating mechanism 141 and the spiral groove 109D formed in the end portion on the upstream side of the dynamic pressure generating mechanism 141' adjacent thereto may be separated from each other by a long distance in the circumferential direction to further increase the pressure which separates the sliding surfaces 11 and 21 from each other.

Third Embodiment

Next, a sliding component according to a third embodiment of the present invention will be described with reference to FIG. 8. Incidentally, the description of configurations which are the same as and duplicated from those in the second embodiment will be omitted.

Figure 8:
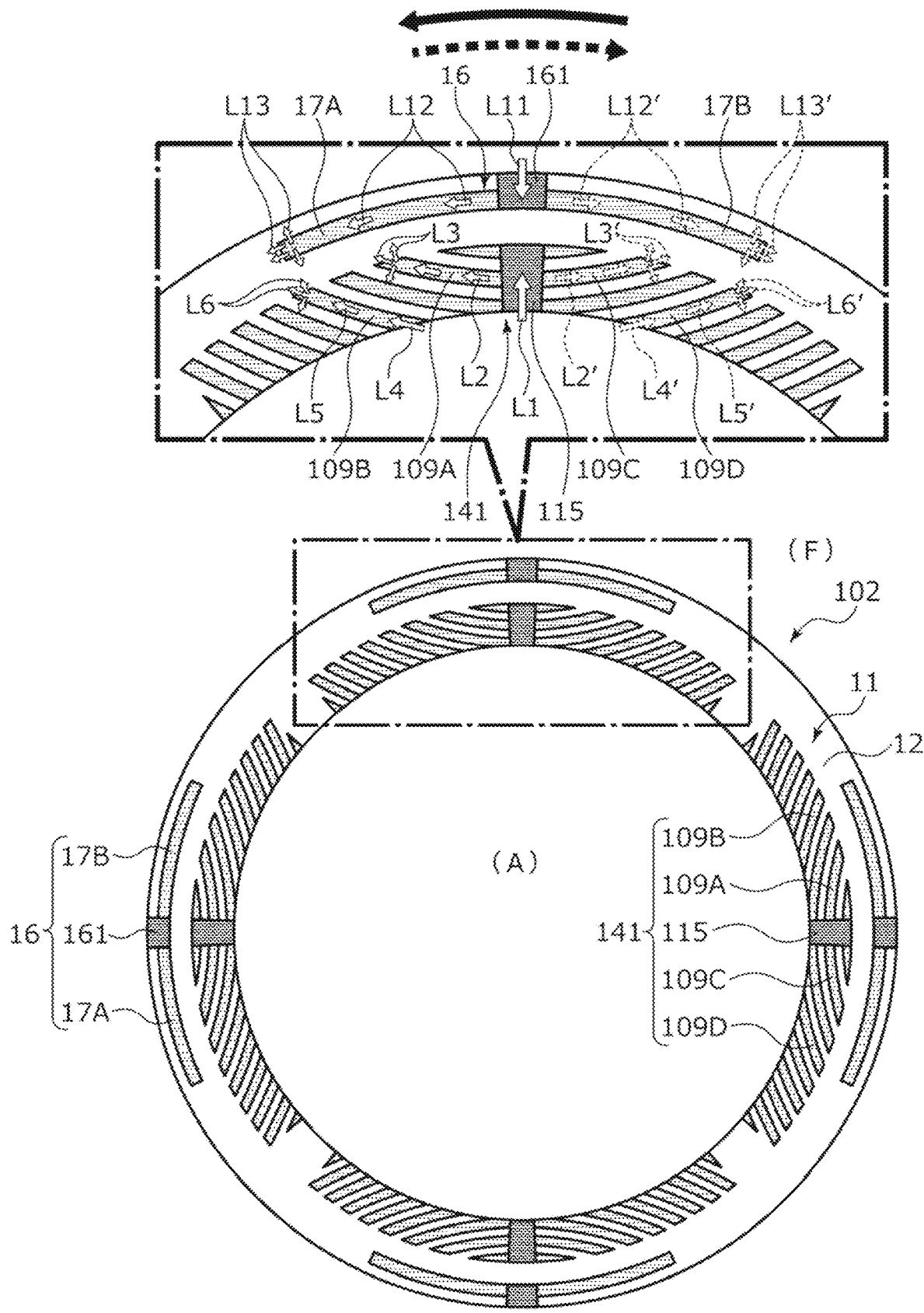
FIG. 8 is a view of a sliding surface of a stationary seal ring as a sliding component according to a third embodiment of the present invention when seen in the axial direction.

As illustrated in FIG. 8, a plurality of the dynamic pressure generating mechanisms 141 and a plurality of specific dynamic pressure generating mechanisms 16 are formed in a stationary seal ring 102. The specific dynamic pressure generating mechanism 16 includes a liquid guide groove portion 161 communicating with the high-pressure side, a Rayleigh step 17A that extends concentrically with the stationary seal ring 102 from an outer diameter side end portion of the liquid guide groove portion 161 toward the downstream side in the circumferential direction, and a reverse Rayleigh step 17B that extends concentrically with the stationary seal ring 102 from the outer diameter side end portion of the liquid guide groove portion 161 toward the upstream side in the circumferential direction. The liquid guide groove portion 161 and the liquid guide groove portion 115 are formed at positions corresponding to each other in the circumferential direction. Namely, the liquid guide groove portion 161 and the liquid guide groove portion 115 are formed along the radial direction. In addition, the liquid guide groove portion 161 functions as a deep groove portion of the specific dynamic pressure generating mechanism 16, and the Rayleigh step 17A and the reverse Rayleigh step 17B function as shallow groove portions of the specific dynamic pressure generating mechanism 16.

The spiral grooves 109A and 109B and the spiral grooves 109C and 109D of the dynamic pressure generating mechanism 141 are formed in a region that is wider in the circumferential direction than a region where the Rayleigh step 17A and the reverse Rayleigh step 17B of the specific dynamic pressure generating mechanism 16 are formed. In addition, the Rayleigh step 17A and the reverse Rayleigh step 17B are formed with the same depth dimension of 5 μm as that of the spiral grooves 109A and 109B and the spiral grooves 109C and 109D. In addition, the volume of the dynamic pressure generating mechanism 141 is larger than the volume of the specific dynamic pressure generating mechanism 16.

When the rotating seal ring 20 rotates counterclockwise on the drawing sheet of FIG. 8, the sealed liquid F moves in order of arrows L11, L12, and L13, so that dynamic pressure is generated in the Rayleigh step 17A. In addition, when the rotating seal ring 20 rotates clockwise on the drawing sheet of FIG. 8, the sealed liquid F moves in order of arrows L11, L12', and L13', so that dynamic pressure is generated in the reverse Rayleigh step 17B. In such a manner, regardless of the relative rotational direction of the stationary seal ring 102 and the rotating seal ring 20, dynamic pressure can be generated in the specific dynamic pressure generating mechanism 16.

In addition, while the dynamic pressure generated in the specific dynamic pressure generating mechanism 16 separates the sliding surfaces 11 and 21 from each other to form an appropriate liquid film therebetween, the sealed liquid F which tends to leak from the sliding surface 11 to the low-pressure side can be recovered by the dynamic pressure generating mechanism 141.

In addition, since the liquid guide groove portion 161 and the liquid guide groove portion 115 are formed along the radial direction, the sealed liquid F tending to leak from the liquid guide groove portion 161 to the low-pressure side is easily introduced to the liquid guide groove portion 115 between the sliding surfaces 11 and 21. Therefore, a leakage of the sealed liquid F to the low-pressure side can be efficiently reduced.

In addition, since the volume of the dynamic pressure generating mechanism 141 is larger than the volume of the specific dynamic pressure generating mechanism 16, the suctioning force of the spiral grooves 109A and 109B and the spiral grooves 109C and 109D of the dynamic pressure generating mechanism 141 is increased, so that a balance in dynamic pressure between the dynamic pressure generating mechanism 141 on the low-pressure side and the specific dynamic pressure generating mechanism 16 on the high-pressure side can be adjusted.

Incidentally, the lengths in the circumferential direction of the spiral grooves 109A and 109B and the spiral grooves 109C and 109D may be the same as that of the Rayleigh step 17A and the reverse Rayleigh step 17B, or may be shorter than that of the Rayleigh step 17A and the reverse Rayleigh step 17B. In addition, the Rayleigh step 17A and the reverse Rayleigh step 17B are formed with a depth dimension different from that of the spiral grooves 109A and 109B and the spiral grooves 109C and 109D. In addition, the width in the radial direction of the Rayleigh step 17A and the reverse Rayleigh step 17B may be the same as the width in the radial direction of the spiral grooves 109A and 109B and the spiral grooves 109C and 109D, or may be larger or smaller than the width in the radial direction of the spiral grooves 109A and 109B and the spiral grooves 109C and 109D. Preferably, the volume of the dynamic pressure generating mechanism 141 may be larger than the volume of the specific dynamic pressure generating mechanism 16.

Next, modification examples of the specific dynamic pressure generating mechanism will be described. As illustrated in FIG. 9A, a specific dynamic pressure generating mechanism of a first modification example is a dimple 30 having a circular recess shape when seen in the direction orthogonal to the sliding surface 11. Incidentally, the shape, number, disposition, and the like of the dimples 30 can be freely changed.

In addition, as illustrated in FIG. 9B, a specific dynamic pressure generating mechanism of a second modification example includes arc grooves 31 and 32 that extend in an arc shape while being inclined in the radial direction. Specifically, outer diameter side end portions of the arc grooves 31 and 32 communicate with the high-pressure side. A plurality of the arc grooves 31 are provided on the outer diameter side of the spiral grooves 109A and 109B, and a plurality of the arc grooves 32 are provided on the outer diameter side of the spiral grooves 109C and 109D.

In addition, the arc groove 31 has a shape such that when the rotating seal ring 20 rotates counterclockwise on the drawing sheet of FIG. 9B, the sealed liquid F moves toward the inner diameter side, and the arc groove 32 has a shape such that when the rotating seal ring 20 rotates clockwise on the drawing sheet of FIG. 9B, the sealed liquid F moves toward the inner diameter side. When the rotating seal ring 20 rotates counterclockwise, the pressure on the inner diameter side of the arc groove 31 increases, and when the rotating seal ring 20 rotates clockwise, the pressure on the inner diameter side of the arc groove 32 increases. Therefore, the sliding surfaces 11 and 21 can be separated from each other to form an appropriate liquid film therebetween. Incidentally, the shape, number, disposition, and the like of the arc grooves 31 and 32 can be freely changed.

Fourth Embodiment

Next, a sliding component according to a fourth embodiment of the present invention will be described with reference to FIG. 10. Incidentally, the description of configurations which are the same as and duplicated from those in the third embodiment will be omitted.

Figure 10:
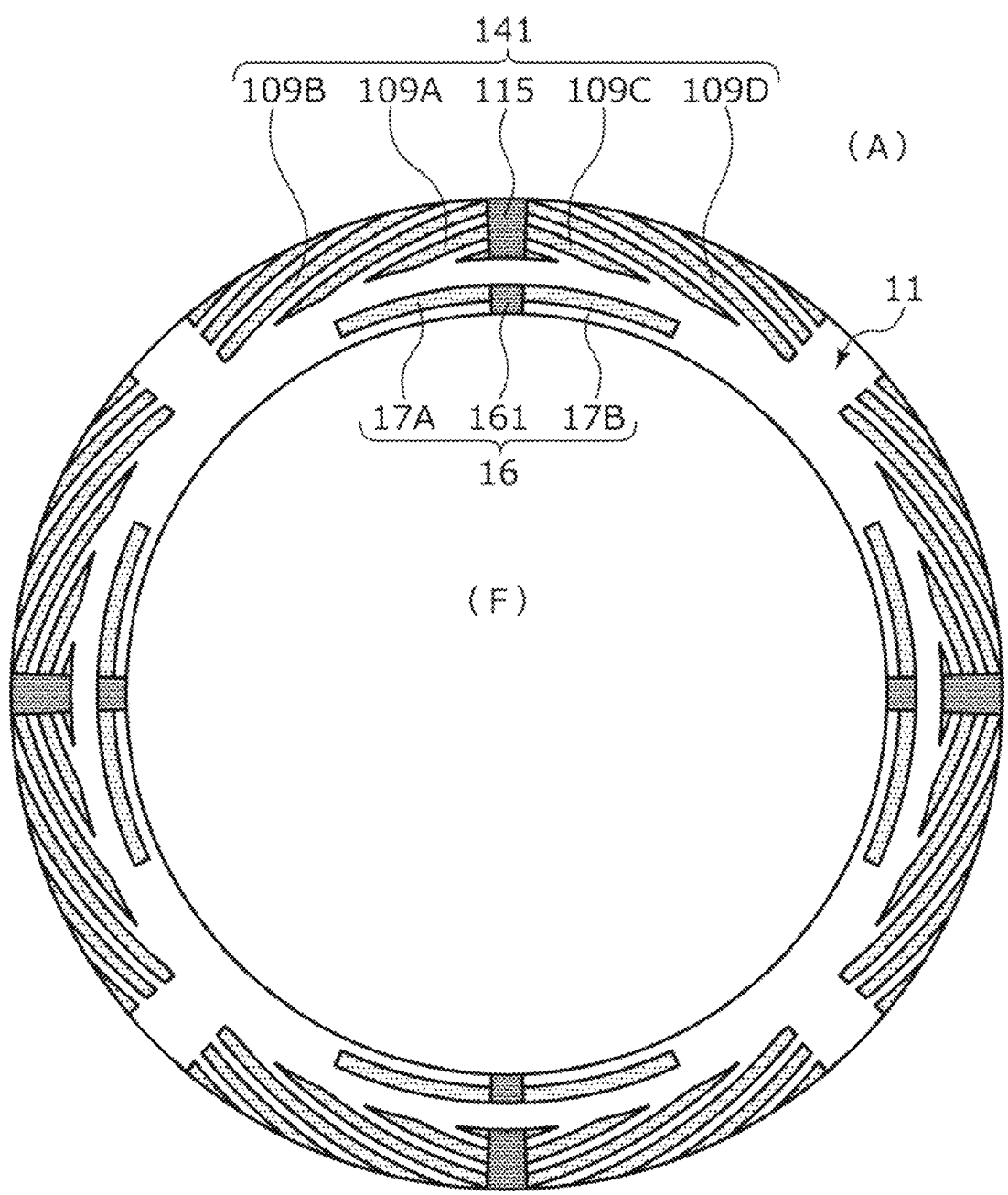
FIG. 10 is a view of a sliding surface of a stationary seal ring as a sliding component according to a fourth embodiment of the present invention when seen in the axial direction.

A mechanical seal illustrated in FIG. 10 is an outside mechanical seal that seals the sealed liquid F which tends to leak from an inner diameter side of sliding surfaces toward an outer diameter side. The dynamic pressure generating mechanism 141 is disposed on the outer diameter side to communicate with a low-pressure side, and the specific dynamic pressure generating mechanism 16 is disposed on the inner diameter side to communicate with a high-pressure side. Incidentally, even in the outside mechanical seal, the dynamic pressure generating mechanism may be formed to correspond to one rotational direction as in the first embodiment. In addition, the specific dynamic pressure generating mechanism may not be provided as in the first embodiment, or the specific dynamic pressure generating mechanism may be formed in another form such as the dimple or the arc grooves illustrated in the modification examples of the third embodiment.

The embodiments of the present invention have been described above with reference to the drawings; however, the specific configuration is not limited to the embodiments, and the present invention also includes changes or additions that are made without departing from the scope of the present invention.

For example, in the embodiments, as an example of the sliding component, the mechanical seal for a general industrial machine has been described, but the present invention may be applied to other mechanical seals for an automobile, a water pump, and the like. In addition, the present invention is not limited to the mechanical seal, and may be applied to a sliding component such as a slide bearing other than the mechanical seal.

In addition, in the embodiments, an example where the dynamic pressure generating mechanism is provided only in the stationary seal ring has been described; however, the dynamic pressure generating mechanism may be provided only in the rotating seal ring 20, or may be provided in both the rotating seal ring 20 and the stationary seal ring.

In addition, in the embodiments, a mode in which the sliding component is provided with the plurality of dynamic pressure generating mechanisms having the same shape has been provided as an example; however, a plurality of dynamic pressure generating mechanisms having different shapes may be provided. In addition, the interval between the dynamic pressure generating mechanism, the number of the dynamic pressure generating mechanisms, or the like can be appropriately changed.

In addition, the description has been given based on the premise that the sealed fluid side is a high-pressure side and the leakage side is a low-pressure side; however, the sealed fluid side may be a low-pressure side and the leakage side may be a high-pressure side, or the sealed fluid side and the leakage side may have substantially the same pressure.

REFERENCE SIGNS LIST

9A Spiral groove (shallow groove portion)
9B Spiral groove (sub-shallow groove portion)
10 Stationary seal ring (sliding component)
11 Sliding surface
14 Dynamic pressure generating mechanism
15 Liquid guide groove portion (deep groove portion)
16 Specific dynamic pressure generating mechanism
17A Rayleigh step (shallow groove portion)
17B Reverse Rayleigh step (shallow groove portion)
18 Step
20 Rotating seal ring (sliding component)
21 Sliding surface
109A, 109C Spiral groove (shallow groove portion)
109B, 109D Spiral groove (sub-shallow groove portion)
115 Liquid guide groove portion (deep groove portion)
141 Dynamic pressure generating mechanism

The invention claimed is:

1. A rotary machine comprising a housing, a rotating shaft configured to rotate with respect to the housing and a mechanical seal disposed between the housing and the rotating shaft, wherein
the mechanical seal includes a first sliding component having a sliding surface and a second sliding component having a sliding surface which faces to the sliding surface of the first sliding surface,
the rotary machine further comprises a biasing member configured to bias the first sliding component toward the second sliding component,
a sliding surface of at least one of the first sliding component and the second sliding component is provided with a plurality of dynamic pressure generating mechanisms each including a deep groove portion that communicates with a leakage side, and a plurality of shallow groove portions that is shallower than the deep groove portion, at least a part of the shallow groove portions communicating with the deep groove portion and being arranged in a circumferential direction in parallel relationship to each other,
each of the dynamic pressure generating mechanisms further includes at least one sub-shallow groove portion that directly communicates with the leakage side, that is arranged on the leakage side of the shallow groove portions, and that is independent of the shallow groove portions,
the deep groove portion has a depth which is five times or more depths of the shallow groove portion and the sub-shallow groove portion,
the shallow groove portions and the sub shallow groove portions are arranged within an imaginary band-shaped region which has a constant radial width and extends in a circumferential direction in concentrical relationship with the mechanical seal,
part of the sub shallow groove portions extends up to an edge line of the imaginary band-shaped region extending in the circumferential direction on a sealed fluid side,
at least one of the shallow groove portion and the sub shallow groove portion is formed in an arc shape in a plan view, and
the arc shape is a shape in which an imaginary straight line connecting both ends of the arc is positioned on the sealed fluid side with respect to the arc.

2. The rotary machine according to claim 1, wherein the shallow groove portions extend from both sides of the deep groove portion in the circumferential direction.

3. The rotary machine according to claim 1, wherein the deep groove portion communicates with an inner diameter side.

4. The rotary machine according to claim 2, wherein the deep groove portion communicates with an inner diameter side.

5. The rotary machine according to claim 1, wherein the shallow groove portions extend toward a sealed fluid side.

6. The rotary machine according to claim 1, wherein the shallow groove portions toward the leakage side are curved in the circumferential direction.

* * * * *